United States Patent [19]

Okada

[11] Patent Number: 6,018,520
[45] Date of Patent: Jan. 25, 2000

[54] BASE STATION APPARATUS AND A MOBILE RADIO TERMINAL FOR A RADIO COMMUNICATION SYSTEM, AND RADIO COMMUNICATION SYSTEM, AND A COMMUNICATING METHOD IN A RADIO COMMUNICATION SYSTEM

[75] Inventor: Yasushi Okada, Kawasaki, Japan

[73] Assignee: Fujitsu Limited, Kanagawa, Japan

[21] Appl. No.: 08/652,647

[22] Filed: May 20, 1996

[30] Foreign Application Priority Data

Oct. 27, 1995 [JP] Japan ................................. 7-281023

[51] Int. Cl.$^7$ .............................. H04B 7/212; H04B 7/26; H04J 3/12
[52] U.S. Cl. .......................... 370/336; 370/345; 370/524; 375/222; 375/241; 455/450; 455/511; 455/553; 455/561
[58] Field of Search ..................................... 370/329, 336, 370/338, 345, 437, 465, 468, 477, 493, 494, 495, 337, 347, 352–354, 522, 524; 375/222, 240, 241, 242; 455/102, 103, 552, 553, 450–452, 507, 509, 511, 517, 560, 561

[56] References Cited

U.S. PATENT DOCUMENTS

| | | | |
|---|---|---|---|
| 4,740,963 | 4/1988 | Eckley | 370/110 |
| 5,233,627 | 8/1993 | Kozima | 375/8 |
| 5,553,079 | 9/1996 | Niki | 370/8 |
| 5,574,771 | 11/1996 | Driessen | 379/57 |
| 5,590,406 | 12/1996 | Bayley | 370/493 |
| 5,642,398 | 6/1997 | Tiedemann | 379/57 |
| 5,684,806 | 11/1997 | Akiyama | 370/522 |
| 5,692,035 | 11/1997 | O'Mahony | 379/93 |
| 5,697,065 | 12/1997 | Sakata | 455/54.1 |
| 5,719,859 | 2/1998 | Kobayashi | 370/347 |

*Primary Examiner*—Alpus H. Hsu
*Attorney, Agent, or Firm*—Helfgott & Karas, P C.

[57] ABSTRACT

A base station for a radio communication system suitable for use if a radio data communication network is configured using a mobile radio terminal has a base station apparatus for a radio communication system which communicates with a mobile radio terminal over a radio line. The base station apparatus for a radio communication system has a voice communication processing system for processing voice signals and a data communication processing system for processing data signals. The data communication processing system has a low-speed modulating/demodulating unit for conducting a modulating/demodulating process on data signals at a processing speed lower than a processing speed of the voice communication processing system, thereby dividing a way of use of a communication channel and a control channel into data communication purpose and voice communication purpose upon data communication so as to increase an efficiency of utilization of the line.

19 Claims, 20 Drawing Sheets

LAYER 3 OF SACCH IS FORMED WITH 2 FRAMES X n

FIG.11

| | 8 | 7 | 6 | 5 | 4 | 3 | 2 | 1 |
|---|---|---|---|---|---|---|---|---|
| PROTOCOL IDENTIFIER | 0 | 1 | 0 | 0 | 0 | 0 | 0 | 1 |
| TIPE OF MESSAGE (FOR OPTION) | 0 | 1 | 1 | 0 | 0 | 0 | 1 | 1 |
| CONTENTS OF CONTROL | /////// DEMAND FOR MODEM CONTROL /////// CONTENTS OF CONTROL /////// | | | | | | | |

131g

PROTOCOL IDENTIFIER---- POSITIONING A CONTROL OF MODEM AS A RADIO SECTION RADIO MANAGEMENT MESSAGE

TYPE OF MESSAGE----011 ASSIGNS CURRENT OPTION TO A CONTROL ON MODEM

FIG. 15

| COMMUNICATION SLOT NUMBER | | APPLICATION | TRANSFER CAPACITY | NOTE |
|---|---|---|---|---|
| 1 | | CONTROL CHANNEL | — | USABLE FOR DATA COMMUNICATION WHEN IT IS VACANT |
| 2 | | VOICE COMMUNICATION CHANNEL | 32 kbps | |
| 3 | | VOICE COMMUNICATION CHANNEL | 32 kbps | |
| 4 | 1~10 | DATA COMMUNICATION CHANNEL | 2400 bps × 5 | |
| | 11~20 | DATA COMMUNICATION CHANNEL | 1200 bps × 10 | |

BASE STATION APPARATUS AND A MOBILE RADIO TERMINAL FOR A RADIO COMMUNICATION SYSTEM, AND RADIO COMMUNICATION SYSTEM, AND A COMMUNICATING METHOD IN A RADIO COMMUNICATION SYSTEM

BACKGROUND OF THE INVENTION

The present invention relates to a base station apparatus and a mobile radio terminal used for a radio communication system, a radio communication system and a communicating method used in a radio communication system, which are suitable for use when a radio data communication network is configured with a mobile radio terminal station in a radio communication system.

In the case of data communication such as personal computer communication, plural personal computers or the like are heretofore connected to a telephone line via modems to communicate with each other.

When a data communication network is configured with mobile radio terminal stations accommodated in a communication network for the purpose of data communication, a personal computer or the like is generally connected to a mobile radio terminal via a modem.

FIG. 18 is a block diagram showing a radio communication system in the case where a data communication network is configured with PHSs (Personal Handyphone Systems) as the above mobile radio terminals. In FIG. 18, reference numerals 201 and 207 denote personal computers (PCs). These personal computers 201 and 207 are able to output data information at a transmission speed of, for example, 1200 bps.

Reference numeral 202 denotes a modem. The modem 202 functions as an interface between the personal computer 201 and a PHS terminal (a PS apparatus for PHS) 203.

More specifically, the modem 202 converts received signals (analog signals) from the PHS terminal 203 into digital signals at 1200 bps and transfers them to the personal computer 201, or converts transmission signals (digital signals at 1200 bps) from the personal computer 201 into analog signals and transfers them to the PHS terminal 203.

Further, reference numeral 206 denotes also a modem. The modem 206 functions as an interface between the personal computer 207 and a switching system 205.

More specifically, the modem 206 converts received signals (analog signals) from the switching system 205 into digital signals at 1200 bps and transfers them to the personal computer 207, or converts transmission signals (digital signals at 1200 bps) from the personal computer 207 and transfers them to the switching system 205.

The PHS terminal 203 is accommodated in a PHS base station 204 described later via a radio line 208, and has a function as a terminal being capable of implementing normal voice communication. On the other hand, when used for data communication by the personal computer 201, the PHS terminal 203 transmits and receives data signal information by analog signals to and from the modem 202.

The PHS terminal 203 has, in detail, an amplifying unit 203a, a PCM (PCM, Pulse-Code Modulation) processing unit 203b, an ADPCM (ADPCM, Adaptive Differential Pulse-Code Modulation) processing unit 203c and a transmitting/receiving unit (RF) 203d. These will be described below, focused on their functions used upon data communication.

The amplifying unit 203a amplifies analog signals from the modem 202 and outputs them, besides amplifying analog signals from the PCM processing unit 203b.

If the PHS terminal 203 functions as a terminal being capable of implementing normal voice communication, the amplifying unit 203a amplifies transmission analog voice signals inputted through a microphone not shown, besides regenerating voice data from a speaker not shown by amplifying received analog voice signals.

The PCM processing unit 203b converts PCM coded signals at a transmission speed of 64 kbps into analog signals which should be outputted to the modem 202, or converts analog signals from the modem 202 into PCM coded signals at a transmission speed of 64 kbps.

The ADPCM processing unit 203c compresses PCM coded signals at a transmission speed of 64 kbps from the PCM processing unit 203b into signals at a transmission speed of 32 kbps in synchronization with the radio line 208, or expands signals at a transmission speed of 32 kbps from the transmitting/receiving unit 203d into signals at 64 kbps.

The transmitting/receiving unit 203d is inputted thereto signals that should be transmitted to the PHS base station 204 over the radio line 208 from the ADPCM processing unit 203c, conducts, for example, a modulating process, a frequency converting process, an amplifying process and the like on the signals that should be transmitted and transmits them, besides conducting, for example, an amplifying process, a frequency converting process, a demodulating process and the like on signals received from the PHS base station 204 over the radio line 208 and outputting them to the ADPCM processing unit 203c.

The PHS base station (a CS apparatus for PHS) 204 exchanges signals as digital signals at 64 kbps with the switching system 205, besides exchanging signals as radio signals at 32 kbps with the PHS terminal 203.

To be concrete, the PHS base station 204 is connected to a line of, for example, four channels (at a transmission speed of, for example, 64 kbps) between the PHS base station 204 and the switching system 205. On the other hand, the PHS base station 204 communicates (in normal voice communication or communication using data signals) with the PHS terminal 203 over a radio line (at a transmission speed of, for example, 32 kbps) 208 using signals obtained by conducting a time-division multiplexing process on line signals on four channels.

As to the above signals on four channels, three channels are used as communication channels for transmitting and receiving communication signals to and from each PHS terminal 203, and the remaining one channel is used as a control channel for transmitting and receiving control signals to and from the switching system 32, for example.

The PHS base station 204 has, in detail, a transmitting/receiving unit 204a, a time division multiplexing/demultiplexing unit (TDMA-TDD, Time Division Multiple Access-Time Division Demultiple) 204b, an ADPCM unit 204c and an interface unit 204d.

The transmitting/receiving unit 204a is inputted thereto signals that should be transmitted to the PHS terminal 203 over the radio line 208 from a timedivision multiplexing/demultiplexing unit 204b, conducts a modulating process, a frequency converting process and an amplifying process on the signals that should be transmitted and sends them out, besides amplifying signals received from the PHS terminal 203 over the radio line 208, down-converting the signals and outputting them to the time-division multiplexing/demultiplexng unit 204b.

The time-division multiplexing/demultiplexing unit 204b demultiplexes signals having been multiplexed in a time-division fashion into, for example, four slots so as to convert them into signals at 32 kbps on four channels, and outputs them to the ADPCM unit 204c, besides outputting signals at 32 kbps on four channels from the ADPCM unit 204c in a frame format multiplexed in a time-division fashion to the transmitting/receiving unit 204a.

The ADPCM processing unit 204c compresses signals on four channels at 64 kbps from the switching system 205 into signals at 32 kbps in synchronization with the radio line 208, besides expanding frame signals from the time-division multiplexing/demultiplexing unit 204b into signals at 64 kbps in synchronization with a ground network.

The interface unit 204d has a function as an interface with the switching system 205 side.

The switching system 205 exchanges data information or voice data from the personal computers 201 and 207. In detail, the switching system 205 has a switching unit 205a and a PCM processing unit (PCM, Pulse-Code Modulation) 205b.

The PCM processing unit 205b converts PCM coded signals at a transmission speed of 64 kbps into analog signals that should be outputted to the modem 206, or converts analog signals from the modem 206 into PCM coded signals at a transmission speed of 64 kbps.

On the radio line 208, as shown in FIG. 19, for example, one communication channel is so assigned that up data (data from the PHS terminal 203 to the PHS base station 204) 208a and down data (data from the PHS base station 204 to the PHS terminal 203) 208b of one slot (160 bits) may be transmitted per 5 msec, whereby signals (voice data in the event of normal voice communication or data signals at the time of data communication such as personal computer communication or the like) may be transmitted as data at 32 kbps when they are transmitted over the radio line 208.

In other words, one slot of up line signals and down line signals is assigned per 5 msec, thereby establishing a path for an adaptive differential pulse code modulation at a transmission speed of 32 kbps.

As indicated by dotted line in FIG. 19, data on the remaining three channels are so assigned that the up data and down data of one slot may be transmitted per 5 msec.

Further, up data 208c and down data 208d on a control channel among the above four channels are intermittently transmitted per, for example, 100 msec as compared with the minimum transmitting/receiving cycle (5 msec), as shown in FIG. 20, for example.

With the above structure, the radio communication system shown in FIG. 18 operates in the following manner when implementing data communication such as personal computer communication between the personal computer 201 and the personal computer 207.

When data signals are transmitted from the personal computer 201 to the personal computer 207, digital data at 1200 bps outputted as communication data from the personal computer 201 are converted into analog signals in the modem 202, then outputted to the PHS terminal 203.

In the PHS terminal 203, the analog signals as the data signals from the modem 202 are conducted a PCM code modulation in the PCM processing unit 203b to be converted into data at 64 kbps, compressed into data at 32 kbps in the ADPCM processing unit 203c, then transmitted from the transmitting/receiving unit 203d to the PHS base station 204 over the radio line 208.

In the PHS base station 204, the data signals (time-division multiplexed signals) received from the PHS terminal 203 are demodulated in the transmitting/receiving unit 204a, demultiplexed in the time-division demultiplexing unit 204b, then converted into ADPCM data on four channels (at a transmission speed of 32 kbps) along with data on the other three channels.

After that, the data at 32 kbps inputted to the ADPCM unit 204c is expanded into PCM data at 64 kbps in synchronization with the ground network, then outputted to the switching system 205.

In the switching system 205, the PCM data at 64 kbps is switched in the switching unit 205a, converted into analog signals in the PCM processing unit 205b, then outputted to the modem 206.

Whereby, the analog signals inputted to the modem 206 are converted into digital data at 1200 bps and outputted to the personal computer 207.

When data signals are transmitted from the personal computer 207 to the personal computer 201, digital data at 1200 bps outputted as communication data from the personal computer 207 are converted into analog signals in the modem 206, then outputted to the switching system 205.

In the PCM processing unit 205b in the switching system 205, the analog data signals inputted from the modem 206 are converted into digital data at 64 kbps, switched in the switching unit 205a, then outputted to the PHS base station 204 as line signals on four channels along with another line signals not shown.

In the PHS base station 204, the inputted digital data at 64 kbps is compressed into ADPCM data at 32 kbps in the ADPCM processing unit 204c, multiplexed in a time-division fashion along with signals on the other three channels in the time division multiplexing/demultiplexing unit 204b, then transmitted from the transmitting/receiving unit 204a to the PHS terminal 203 over the radio line 208.

In the PHS terminal 203, the received data (at a transmission speed of 32 kbps) from the PHS base station 204 is expanded to data at 64 kbps in the ADPCM processing unit 203c, converted into analog signals in the PCM processing unit 203b, then outputted to the modem 202.

In the modem 202, the analog signals from the PCM terminal 203 are converted into digital signals at 1200 bps, outputted as data signals from the personal computer 207 to the personal computer 202, whereby personal computer communication is established.

Incidentally, when voice signals are received by the PHS terminal 203 in the case of normal voice communication using the communication modem shown in FIG. 18, the voice signals from the terminal apparatus not shown other than the PHS terminal 203 is received by the PHS terminal 203 via the switching system 205 and the PHS base station 204 over the radio line 208 similarly to the digital data from the PCM processing unit 205b in the switching system 205 in the case of the above personal computer communication. In the PHS terminal 203, analog signals amplified by the amplifying unit 203a are outputted to a speaker not shown so as to be regenerated.

When voice signals are transmitted from the PHS terminal 203, the voice signals which are analog signals inputted through a microphone not shown provided in the PHS terminal 203 are converted into digital voice signals at 32 kbps to be transmitted similarly to the analog signals from the modem 202 in the case of the above personal computer communication, then transmitted to a desired terminal apparatus via the PHS base station 204 and the switching system 205 similarly to the above data communication.

When data communication such as personal computer communication is implemented in the radio communication system as shown in FIG. 18, data outputted from the personal computers 201 and 207 are handled simultaneously with digitized voice data at 32 kbps on the radio line 208 although a transmission speed of the data from the personal computer 201 and 207 is 1200 bps.

More specifically, when a personal computer communication is implemented between the personal computer 201 and the personal computer 207, one communication channel is occupied by this personal computer communication. In consequence, although it is possible to transmit data at 32 kbits per one second, for example, the transmitted data is of 1200 bits as actual data. This means that the data communication is in a capacity thirty times an actual communication capacity, which leads to a low efficiency of utilization of the line.

As shown in FIG. 20, the control data transmitted and received over the control channel has less information quantity than the communication data. If transmitted at a transmission speed of 32 kbps, the control data is transmitted and received intermittently, which also leads to a low efficiency of utilization of the line.

SUMMARY OF THE INVENTION

In the light of the above problems, an object of the present invention is to provide a base station apparatus and a mobile radio terminal for a radio communication system, a radio communication system, and a communicating method for use in the radio communication system, which can improve an efficiency of utilization of a line by dividing a way of use of a communication channel and a control channel into data communication purpose and voice communication purpose.

The present invention therefore provides a base station apparatus for a radio communication system for communicating with a mobile radio terminal over a radio line comprising a voice communication processing system for processing voice signals and a data communication processing system for processing data signals, the data communication processing system comprising a low-speed modulating/demodulating unit for modulating and demodulating the data signals at a processing speed lower than a processing speed of the voice communication processing system.

According to the present invention, the low-speed modulating/demodulating unit is provided to the base station apparatus for a radio communication system. If a demand for data communication is made, it is possible to divide a way of use of a communication channel and a control channel into data communication purpose and voice communication purpose by connecting a path including the low-speed modulating/demodulating unit in a time-division fashion and according to a type of a terminal so as to improve a throughput or an efficiency of utilization of a line. In particular, it is therefore possible to increase an apparent capacity of a communication line in the case of data communication so as to efficiently configure a radio data communication network by means of a radio communication system such as personal computer communication, radio LAN, or the like.

The present invention also provides a base station apparatus for a radio communication system for communicating with a mobile radio terminal over a radio line, and being connected to a digital switching network comprising a time-division multiplex processing unit for conducting a time-division multiplexing process on signals transmitted and received by an antenna, a code expansion/compression processing unit being connected to the time-division multiplex processing unit to conduct an expanding/compressing process on voice signals, a low-speed modulating/demodulating unit being connected to the time-division multiplex processing unit to conduct a modulating/demodulating process on data signals at a processing speed lower than a processing speed of the code expansion/compression processing unit, an interface processing unit being connected to the low-speed modulating/demodulating unit to conduct an analog/digital converting process and a digital/analog converting process on the data signals, a voice/data communication switching unit for selectively switching the code expansion/compression processing unit or the interface processing unit, a storing unit for storing data as to whether the mobile radio terminal is a mobile radio terminal for voice communication or a mobile radio terminal for data communication at the time of location registration of the mobile radio terminal, and a control unit for transmitting control channel information to the mobile radio terminal through the time-division multiplex processing unit and the antenna in response to a demand from a network, and controlling assignment of a communication channel between the base station apparatus and the mobile radio terminal on the basis of stored information in the storing unit.

According to the present invention, the low-speed modulating/demodulating unit is provided to the base station apparatus for a radio communication system. If a demand for data communication is made, it is possible to divide a way of use of a communication channel and a control channel into data communication purpose and voice communication purpose by connecting a path including the low-speed modulating/demodulating unit in a time-division fashion and according to a type of a terminal so as to improve a throughput or an efficiency of utilization of a line. In particular, it is therefore possible to increase an apparent capacity of a communication line in the case of data communication so as to efficiently configure a radio data communication network by means of a radio communication system such as personal computer communication, radio LAN, or the like.

The present invention also provides a mobile radio terminal for a radio communication system for communicating with a base station apparatus over a radio line comprising a voice communication processing system for processing voice signals, a data communication processing system for processing data signals, a control unit for generating control data including at least location registration data to the base station apparatus, and a switching unit for selectively switching the voice communication processing system, the data communication processing system or the control unit.

According to the present invention, the low-speed modulating/demodulating unit is provided to the base station apparatus for a radio communication system. If a demand for data communication is made, it is possible to divide a way of use of a communication channel and a control channel into data communication purpose and voice communication purpose by connecting a path including the low-speed modulating/demodulating unit in a time-division fashion and according to a type of a terminal so as to improve a throughput or an efficiency of utilization of a line. In particular, it is therefore possible to increase an apparent capacity of a communication line in the case of data communication so as to efficiently configure a radio data communication network by means of a radio communication system such as personal computer communication, radio LAN, or the like.

According to the present invention, the control unit may manage a condition of connection to a data terminal. In particular, the control unit may control a power source to be turned on based on a condition of connection to the data terminal. It is therefore possible to contribute to power saving by saving a battery of a mobile radio terminal.

The present invention also provides a radio communication system having a base station apparatus and a mobile radio terminal communicating with each other over a radio line, the base station apparatus comprising a base station voice communication processing system for processing voice signals, a base station data communication processing system for processing data signals, the base station data communication processing system comprising a low-speed modulating/demodulating unit for conducting a modulating/demodulating process on the data signals at a processing speed lower than a processing speed of the base station voice communication processing system, an analog/digital converting unit being connected to the low-speed modulating/demodulating unit to conduct an analog/digital converting process on the data signals, the mobile radio terminal comprising a radio terminal voice communication processing system for processing voice signals, a radio terminal data communication processing system for processing data signals, a control unit for generating control data including at least location registration data to the base station apparatus, and a switching unit for selectively switching the radio terminal voice communication processing system, the radio terminal data communication processing system or the control unit.

According to the present invention, the low-speed modulating/demodulating unit is provided to the base station apparatus for a radio communication system. If a demand for data communication is made, it is possible to divide a way of use of a communication channel and a control channel into data communication purpose and voice communication purpose by connecting a path including the low-speed modulating/demodulating unit in a time-division fashion and according to a type of a terminal so as to improve a throughput or an efficiency of utilization of a line. In particular, it is therefore possible to increase an apparent capacity of a communication line in the case of data communication so as to efficiently configure a radio data communication network by means of a radio communication system such as personal computer communication, radio LAN, or the like.

The present invention also provide a communicating method in a radio communication system having a base station apparatus and a mobile radio terminal communicating with each other over a radio line having a communication channel and a control channel comprising the steps of assigning one slot for every first period on the communication channel at the time of transmission and reception of voice signals to implement communication using the voice signals, and assigning plural slots for every second period longer than the first period on the communication channel at the time of transmission and reception of data signals to implement communication using the data signals.

According to the present invention, the low-speed modulating/demodulating unit is provided to the base station apparatus for a radio communication system. If a demand for data communication is made, it is possible to divide a way of use of a communication channel and a control channel into data communication purpose and voice communication purpose by connecting a path including the low-speed modulating/demodulating unit in a time-division fashion and according to a type of a terminal so as to improve a throughput or an efficiency of utilization of a line. In particular, it is therefore possible to increase an apparent capacity of a communication line in the case of data communication so as to efficiently configure a radio data communication network by means of a radio communication system such as personal computer communication, radio LAN, or the like.

BRIEF DESCRIPTION OF THE DRAWINGS

FIGS. 10 through 12 show a format of signals on communication channels according to the embodiment of this invention;

FIG. 15 shows a format of signals on the communication channels according to the embodiment of this invention;

DESCRIPTION OF THE PREFERRED EMBODIMENT (a) Description of Aspects of the Invention Now, description will be made of aspects of the present invention with reference to the drawings.

Figure 1:
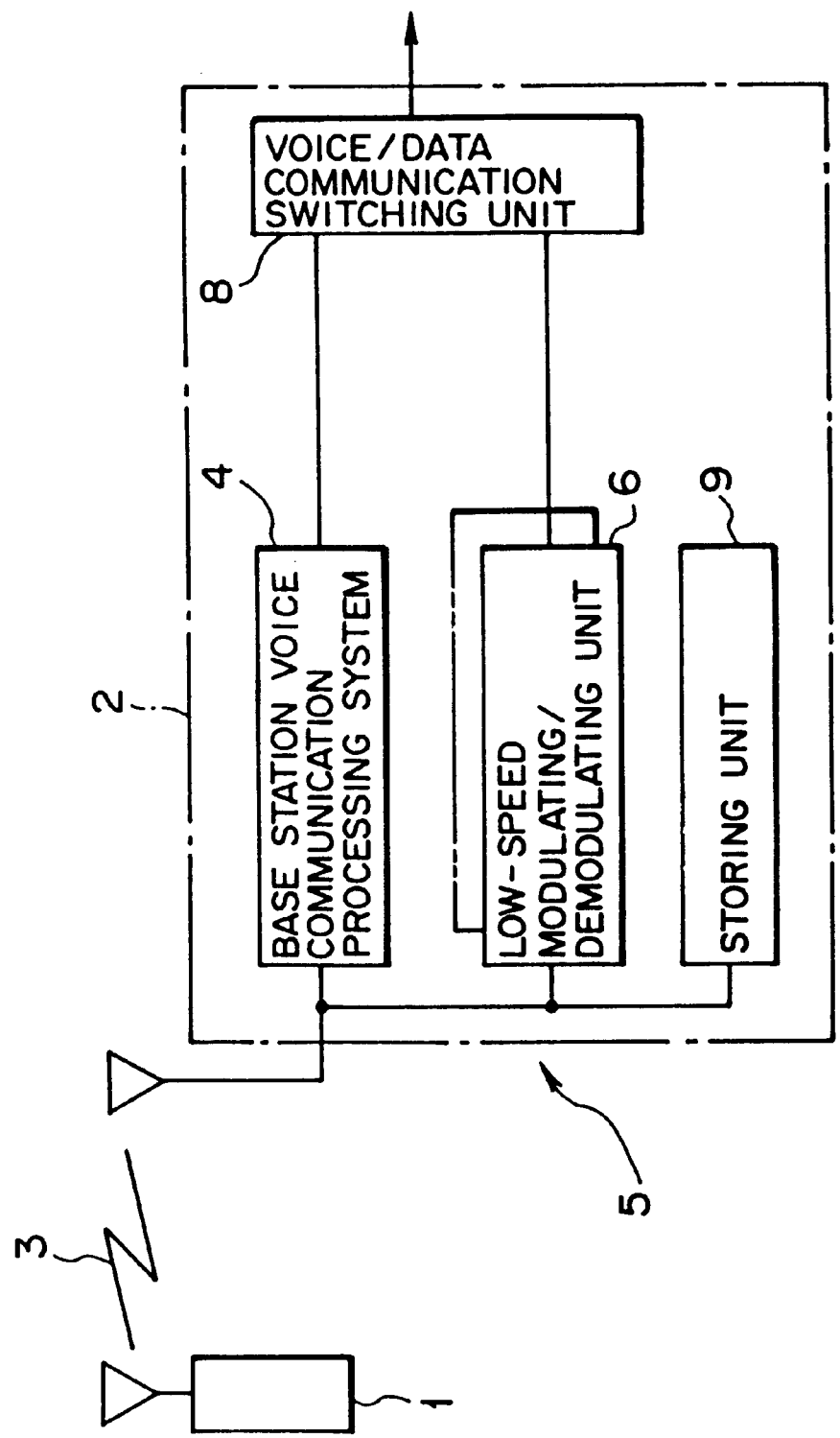
FIGS. 1 through 3 are block diagrams showing aspects of this invention.

FIG. 1 is a block diagram showing an aspect of the present invention. In FIG. 1, reference numeral 2 denotes a base station apparatus for a radio communication system which communicates with a mobile radio terminal 1 over a radio line 3. The base station apparatus for a radio communication system 2 has a voice communication processing system 4 for processing voice signals and a data communication processing system 5 for processing data signals.

The data communication processing system 5 is provided with a low-speed modulating/demodulating unit 6 for conducting a modulating/demodulating process on data signals at a processing speed lower than a processing speed of the voice communication processing system 2.

As indicated by a chain line in FIG. 1, it is possible to configure the low-speed modulating/demodulating unit 6 with plural low-speed modulating/demodulating units. In which case, the plural low-speed modulating/demodulating units 6 may be low-speed modulating/demodulating units at the same processing speed, or at least a part of the plural low-speed modulating/demodulating units 6 may be low-speed modulating/demodulating units at processing speeds different from each other.

The base station apparatus for a radio communication system 2 may have a voice/data communication switching unit 8 for selectively switching the voice communication processing system 4 or the data communication processing system 5.

Further, the base station apparatus for a radio communication system 2 may have a storing unit 9 for storing data as to whether the mobile radio terminal 1 is a mobile radio terminal for voice communication or a mobile radio terminal for data communication at the time of location registration of the mobile radio terminal 1.

According to this invention, the base station apparatus for a radio communication system 2 has the low-speed modulating/demodulating unit 6. If a demand for data communication is made, a path including the low-speed modulating/demodualting unit 6 is connected in a time-division fashion and according to a type of a terminal so as to divide a way of use of a communication channel and a control channel into data communication purpose and voice communication purpose, thereby improving a throughput or an efficiency of utilization of the line, increasing an apparent capacity of a communication line in the case of a data communication, in particular. This allows an efficient configuration of a radio data communication network by means of a radio communication system such as personal computer communication, radio LAN or the like.

According to the present invention, it is possible to set plural data communication lines using a communication channel by means of the plural low-speed modulating/demodualting units 6 so that equipments such as a modem and the like in the system may be effectively used according to a communication speed of a connected mobile radio terminal.

Figure 2:
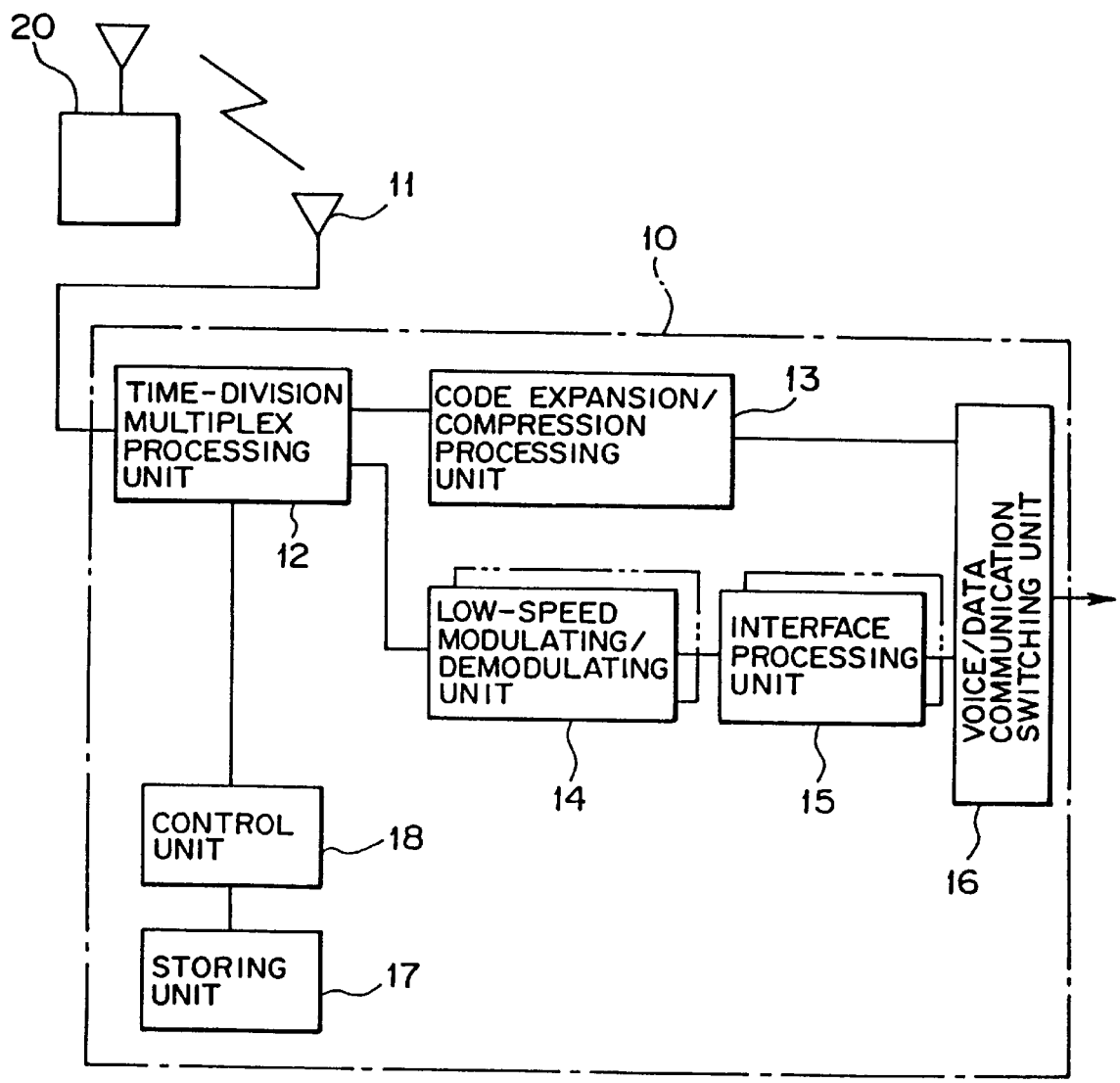

FIG. 2 is a block diagram showing a second aspect of the present invention. In FIG. 2, reference numeral 10 denotes a base station apparatus for a radio communication system. The base station apparatus for a radio communication system 10 communicates with a mobile radio terminal 20 over a radio line, and is connected to a digital switching network. The base station apparatus for a radio communication system 10 has a time-division multiplex processing unit 12, a code expansion/compression processing unit 13, a low-speed modulating/demodulating unit 14, an interface processing unit 15, a voice/data communication switching unit 16, a storing unit 17 and a control unit 18.

The time-division multiplex processing unit 12 conducts a time-division multiplexing process on signals transmitted or received by an antenna 11. The code expansion/compression processing unit 13 is connected to the time-division multiplex processing unit 12 to conduct an expanding/compressing process on voice signals.

The low-speed modulating/demodulating unit 14 is connected to the time-division multiplex processing unit 12 to conduct a modulating/demodulating process on data signals at a processing speed lower than a processing speed of the code expansion/compression processing unit 13.

The interface processing unit 15 is connected to the low-speed modulating/demodulating unit 14 to conduct an analog/digital converting process and a digital/analog converting process on data signals. The voice/data communication switching unit 16 selectively switches the above code expansion/compression processing unit 13 or the interface processing unit 15.

The storing unit 17 stores data as to whether the mobile radio terminal 20 is a mobile radio terminal for voice communication or a mobile radio terminal for data communication at the time of location registration of the mobile radio terminal 20.

The control unit 18 transmits control channel information to the mobile radio terminal 20 through the time-division multiplex processing unit 12 and the antenna 11 in response to a demand from the network, or controls assignment of a communication channel with the mobile radio terminal 20 on the basis of stored information in the storing unit 17.

In this case, the code expansion/compression processing unit 13 may be configured with plural code expansion/compression processing units, besides the low-speed modulating/demodulating unit 14 may be configured with plural low-speed modulating/demodulating units. In addition, an analog/digital converting unit may be provided correspondingly to each of the low-speed modulating/demodualting units 14.

The plural low-speed modulating/demodulating units 14 may be low-speed modulating/demodulating units at the same processing speed. Alternatively, at least a part of the plural low-speed modulating/demodualting units 14 may operate at processing speeds different from each other.

According to the present invention, the low-speed modulating/demodulating unit 14 is provided in the base station apparatus for a radio communication system 10. If a demand for data communication is made, a path including the low-speed modulating/demodulating unit is connected in a time-division fashion and according to a type of a terminal so as to divide a way of use of a control channel into data communication purpose and voice communication purpose, thereby increasing a throughput or an efficiency of utilization of the line. In particular, it is possible to increase an apparent capacity of a communication line in the case of data communication, and thus efficiently configure a radio data communication network by means of a radio communication system such as personal computer communication, radio LAN, or the like.

According to the present invention, the plural low-speed modulating/demodulating units 14 can set plural data communication lines using a communication channel. It is therefore possible to efficiently use equipments such as a modem and the like in the system depending on a communication speed of the connected mobile radio terminal 20.

Further, according to the present invention, the voice/data communication switching unit 16 may set a route of an interface at, for example, 64 kbps with a network by connecting the route to the code expansion/compression unit 13 or to the interface processing unit 15, whereby a line for voice communication and a line for data communication may be set without spoiling a normal function of the base station apparatus for a radio communication system 10.

Figure 3:
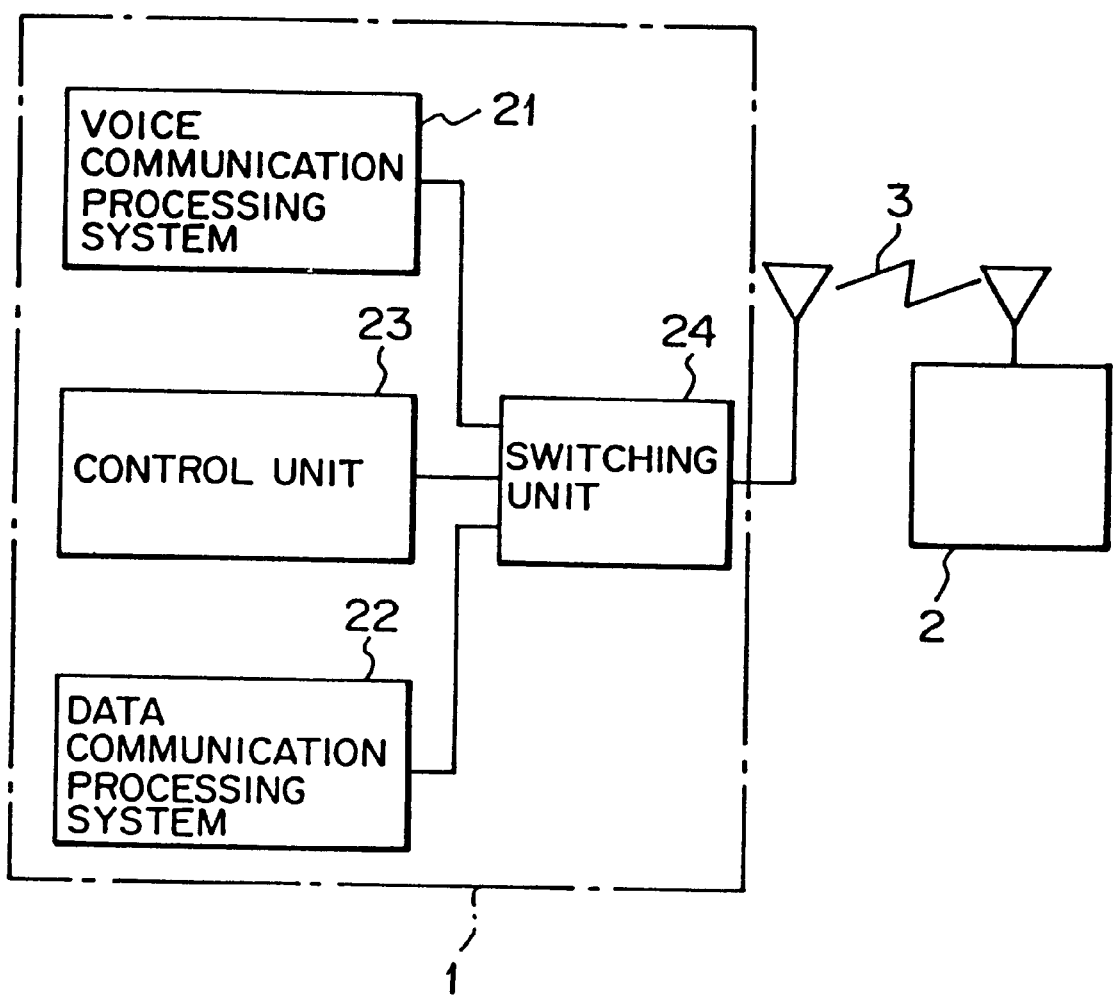

FIG. 3 is a block diagram showing a third aspect of the present invention. In FIG. 3, reference numeral 1 denotes a mobile radio terminal for a radio communication system for communicating with a base station apparatus 2 over a radio line 3.

The mobile radio terminal for a radio communication system 1 has a voice communication processing system 21 for processing voice signals, a data communication processing system 22 for processing data signals, a control unit 23 for generating control data to the base station apparatus 2 including at least location registration data, and a switching unit 24 for selectively switching the voice communication processing system 21, the data communication processing system 22 or the control unit 23.

When a data terminal is connected to the mobile radio terminal 1, the control unit 23 may output this effect as control data. The control unit 23 may further control a power source to be turned on only when the data communication processing system 22 operates.

According to the present invention, a low-speed modulating/demodulating unit is provided to the base station apparatus for a radio communication system 2. If a demand for a data communication is made, it is possible to divide a way of use of a communication channel and a control channel into data communication purpose and voice communication purpose by connecting a path including the low-speed modulating/demodulating unit in a time-division fashion and according to a type of a terminal. It is therefore possible to increase a throughput or an efficiency of utilization of the line. In addition, it is possible to increase an apparent capacity of a communication line in the case of data communication, in particular, thereby efficiently configuring a radio data communication network by means of a radio communication system such as personal computer communication, radio LAN, or the like.

According to the present invention, plural low-speed modulating/demodulating units can set plural data communication lines using a communication channel. It is therefore possible to efficiently use equipments such as a modem and the like in the system depending on a communication speed of the connected mobile radio terminal 1.

Further, according to the present invention, the control unit 23 can control a condition of connection to a data terminal. The control unit 23 can, in particular, control a power source to be turned on based on a condition of connection to the data terminal. It is therefore possible to contribute to power saving by saving a battery of the mobile radio terminal 1.

It is also possible to configure a radio communication system having the base station apparatus 2 and the mobile radio terminal 1 communicating with each other over the radio line 3 by using the above-mentioned base station apparatus for a radio communication system 2 shown in FIG. 1 and the above-mentioned mobile radio terminal for a radio communication system 1 shown in FIG. 3.

In which case, the base station apparatus 2 is provided with the base station voice communication processing system 4 for processing voice signals and the base station data communication processing system 5 for processing data signals. Further, the base station data communication processing system 5 includes the low-speed modulating/demodulating unit 6 conducting a modulating/demodulating process on data signals at a processing speed lower than a processing speed of the base station voice communication processing system 4, besides the mobile radio terminal 1 includes the radio terminal voice communication processing system 21 for processing voice signals, the radio terminal data communication processing system 22 for processing data signals, the control unit 23 for generating control data including at least location registration data to the base station apparatus 2, and the switching unit 24 for selectively switching the radio terminal voice communication processing system 21, the radio terminal data communication processing system 22 or the control unit 23.

According to the present invention, in a communicating method used in a radio communication system having a base station apparatus and a mobile radio terminal which communicate with each other over a communication channel and a control channel, one slot is assigned for every first period as to a communication channel to communicate using voice signals when the voice signals are transmitted or received, on the other hand, plural slots are assigned for every second period longer than the first period as to a communication channel to communicate using data signals when data signals are transmitted or received.

In this case, it is possible to increase the number of used channels in the case of transmission and reception of signals including data signals as compared with transmission and reception of only voice signals.

Base station apparatus control information is multiplexed and transmitted from the mobile radio terminal to the base station apparatus over a communication channel so as to control assignment of slots when data signals are transmitted and received. It is also possible to alter the number of assigned slots according to a communication speed of data signals.

Control data as to whether a data terminal is connected to a mobile radio terminal or not may be transmitted to the base station apparatus from the mobile radio terminal over a control channel.

When data signals are transmitted or received, it is also possible to communicate using data signals at a timing of vacant slots on the control channel.

According to the present invention, the low-speed modulating/demodualting unit is provided to the base station apparatus for a radio communication system. If a demand for data communication is made, it is possible to divide a way of use of a communication channel and a control channel into data communication purpose and voice communication purpose by connecting a path including the low-speed modulating/demodulating unit in a time-division fashion and according to a type of a terminal so that a throughput or an efficiency of utilization of the line may be improved. In particular, it is possible to increase an apparent capacity of a communication line in the case of data communication, thereby efficiently configuring a radio data communication network by means of a radio communication system such as personal computer communication, radio LAN, or the like.

According to the present invention, plural low-speed modulating units can set plural data communication lines using a communication channel. It is therefore possible to efficiently use equipments such as a modem and the like in the system depending on a communication speed of a connected mobile radio terminal.

According to the present invention, the control unit can manage a condition of connection to a data terminal. In particular, the control unit can control a power source to be turned on based on a condition of connection to a data terminal, thereby contributing to power saving by saving a battery of the mobile radio terminal.

(b) Description of An Embodiment of The Invention

Hereinafter, description will be made of an embodiment of the present invention referring to the drawings.

Figure 4:
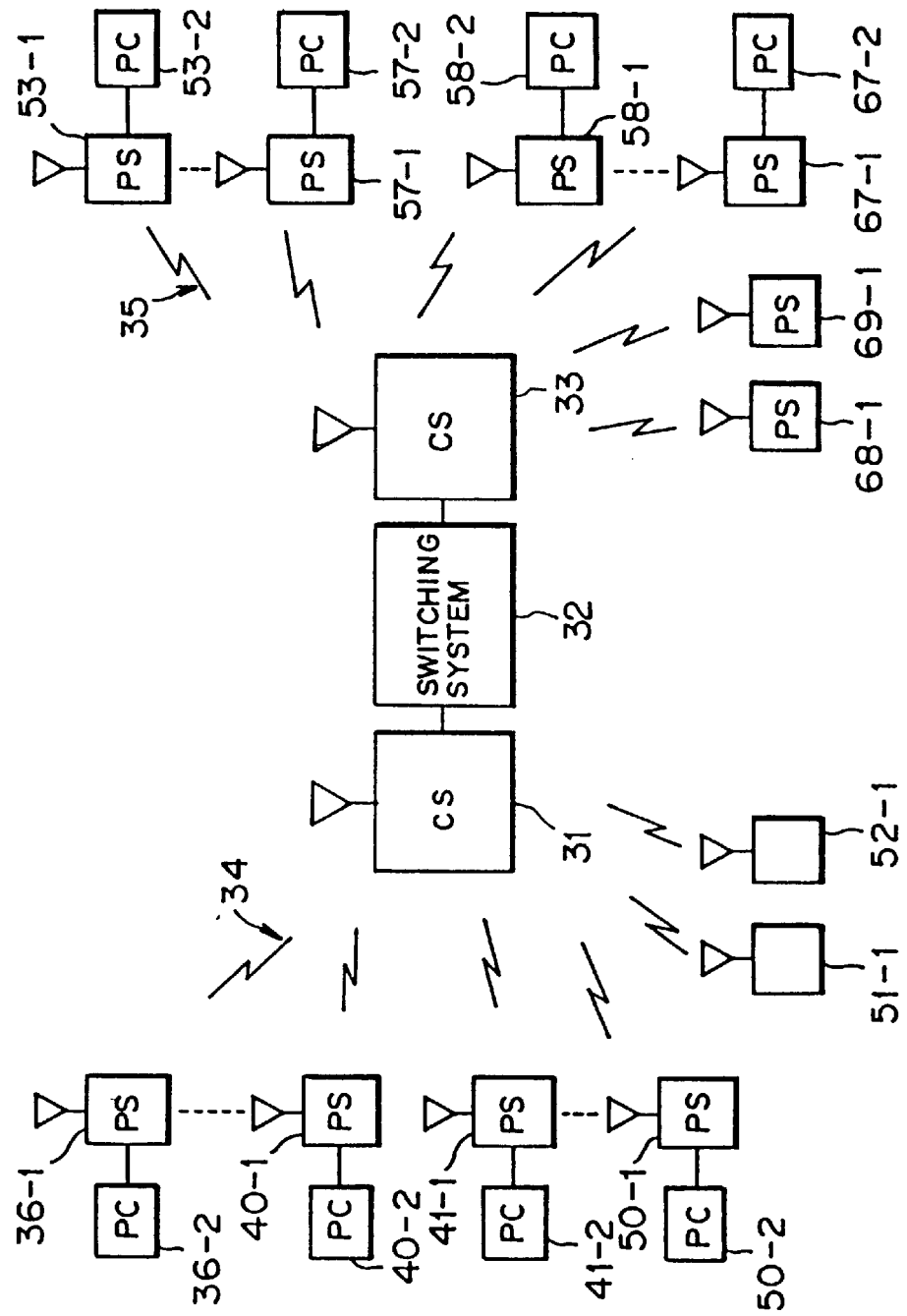
FIG. 4 is a block diagram showing a radio communication system applied to an embodiment of this invention.

FIG. 4 is a block diagram showing a radio communication system applied to an embodiment of this invention. In FIG. 4, reference numerals 31 and 33 denote PHS base stations (CSs). These PHS base stations 31 and 33 have functions as a base station apparatus for a radio communication system to enable communication among PHS terminals (PSs) 36-1 through 52-1 and 53-1 through 69-1 over radio lines 34, 35, respectively.

More specifically, the PHS base station 31 accommodates the PHS terminals 36-1 through 52-1 via the radio line 34. The PHS base station 33 accommodates the PHS terminals 53-1 through 69-1 via the radio line 35.

Further, these PHS base stations 31 and 33 are connected to each other via a digital switching system 32 which switches by way of, for example, an ISDN network (Integrated Services Digital Network). The PHS terminals 36-1 through 69-1 can thereby communicate with each other via the PHS base stations 31 and 33, and the digital switching system 32 over the radio line 34 and 35.

The PHS terminals 36-1 through 52-1 have functions as mobile radio terminals for a radio communication system to communicate with the PHS base station 31 over the radio line 34, whereas the PHS terminals 53-1 through 69-1 have functions as mobile radio terminals for a radio communication system to communicate with the PHS base station 33 over the radio line 35.

The PHS terminals 36-1 through 40-1 are connected to personal computers (PCs) 36-2 through 40-2 as data terminals, respectively, each of which can send digital data signals at a transmission speed of 2400 bps. The PHS terminals 41-1 through 50-1 are connected to personal computers (PCs) 41-2 through 50-2 as data terminals, respectively, each of which can send digital data signals at a transmission speed of 1200 bps.

Similarly, the PHS terminals 53-1 through 57-1 are connected to personal computers 53-2 through 57-2 as data terminals, respectively, each of which can send digital data at a transmission speed of 2400 bps. The PHS terminals 58-1 through 67-1 are connected to personal computers 58-2 through 67-2 as data terminals, respectively, each of which can send digital data at a transmission speed of 1200 bps.

Whereby, the above personal computers 36-2 through 50-2 and 53-2 through 67-2 are connected so as to implement a personal computer communication with each other. The PHS terminals 36-1 through 50-1 and 53-1 through 67-1 can configure mobile radio terminals for data communication.

The PHS terminals 51-1, 52-1, 68-1 and 69-1 are not connected to personal computers so that they configure mobile radio terminals for voice communication which implement normal voice communication.

Figure 5:
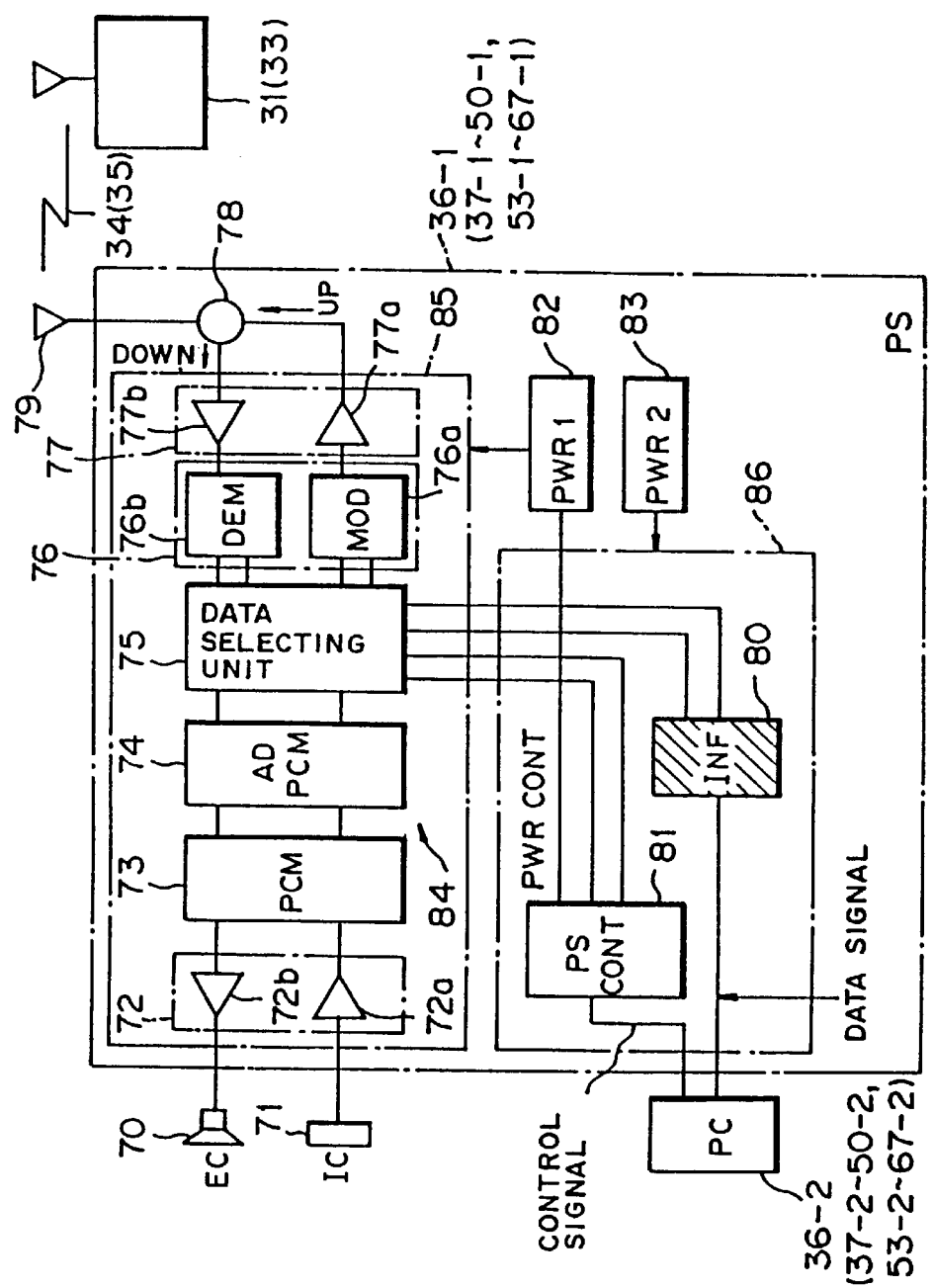
FIG. 5 is a block diagram showing a PHS terminal according to the embodiment of this invention.

The PHS terminals 36-1 through 52-1 and 53-1 through 69-1 each has a structure as shown in FIG. 5, in detail. Incidentally, a structure of the PHS terminal shown below will be described focusing on the PHS terminal 36-1 accommodated in the PHS base station 31. Another PHS terminals 37-1 through 52-1 and 53-1 through 69-1 have similar structures, thus descriptions of these are omitted.

In FIG. 5, reference numeral 84 denotes a voice communication processing system for processing voice signals. The voice communication processing system 84 is configured with an amplifying unit 72, a PCM (PCM, Pulse-Code Modulation) processing unit 73 and an ADPCM (ADPCM, Adaptive Differential Pulse-Code Modulation) processing unit 74.

The amplifying unit 72 has an amplifier 72a for amplifying voice signals as down line signals (signals inputted from the digital switching system 32 via the PHS base station 31 or 33) and outputting them to a speaker 70, and an amplifier 72b for amplifying voice signals inputted through a microphone 71 as up line signals (signals outputted from the terminal side to the digital switching system via the PHS base station 31 or 33) and outputting them to the PCM processing unit 73.

The PCM processing unit 73 converts PCM coded voice signals at a transmission speed of 64 kbps into analog signals and outputs them to the amplifying unit 72, besides conducting a PCM coding process on analog signals fed from the amplifying unit 72 to convert the signals into digital signals at 64 kbps.

The ADPCM processing unit 74 compresses PCM coded signals at a transmission speed of 64 kbps from the PCM processing unit 73 into signals at a transmission speed of 32 kbps in synchronization with the radio line 34, or expands signals at a transmission speed of 32 kbps received over the radio line 34 into signals at 64 kbps.

Reference numeral 80 denotes an INF unit. The INF unit 80 has a function as a data communication processing system for processing data signals. In practice, the INF unit 80 operates as an interface between the personal computer 36-2 and the PHS terminal 36-1 when the personal computer 36-2 as a data terminal transmitting data signals is connected to the PHS terminal 36-1, and detects a connection with the personal computer 36-2 and notifies it to a control unit 81 described later.

The control unit (PSCONT) 81 has a function as a control unit for generating control data including at least location registration data to the base station apparatus so as to control a whole operation of the PHS terminal 36-1 under a software control.

In practice, when the personal computer 36-2 is connected to the PHS terminal 36-1, the control unit 81 outputs this effect as control data, besides controlling a power source (PWR1) 82 described later so as to be turned on only when the INF unit 80 as the data communication processing system operates.

In other words, the PHS terminal 36-1 transmits control data as to whether the personal computer 36-2 is connected to the PHS terminal 36-1 or not to the PHS base station 31 over a control channel.

Reference numeral 75 denotes a data selecting unit. The data selecting unit 75 has a function as a switching unit for selectively switching the voice communication processing system 84, the INF unit 80 as the data communication system or the control unit 81.

In practice, the data selecting unit 75 selects any one among the ADPCM processing unit 74, the INF unit 80 and the control unit 81 so as to supply transmitting/receiving data over the radio line to the selected one.

Reference numeral 76 denotes a modulating/demodulating unit. The modulating/demodulating unit 76 has a modulator (MOD) 76a for modulating digital signals selected by and outputted from the data selecting unit 75, and a demodulator (DEM) 76b for demodulating digital signals received from the PHS base station 31 over the radio line 34.

Reference numeral 77 denotes an amplifying unit. The amplifying unit 77 has an amplifier 77a for amplifying modulated signals from the modulator 76a in the modulating/demodulating unit 76, and an amplifier 77b for amplifying digital signals received from the PHS base station 31 over the radio line 34 and outputting them to the demodulator 76b.

Reference numeral 78 denotes a transmitting/receiving sharing unit. The transmitting/receiving sharing unit transmits up line signals from the amplifier 77a to the PHS base station 31 through an antenna 79 over the radio line 34, besides outputting down line signals received by the antenna 79 to the amplifier 77b for the down line signals.

A power source 82 functions as power supply source for a main circuit 85 made up of the above amplifying unit, 72, the PCM processing unit 73, the ADPCM processing unit 74, the data selecting unit 75, the modulating/demodulating unit 76 and the amplifying unit 77. The power source 82 is switched on under a control of the above control unit 81 only when the INF unit 80 as a data communication processing system operates.

Reference numeral 83 denotes a power source (PWR2). The power source 83 functions as a power supply source for an interface circuit (a control system) 86 made up of the above INF unit 80 and the control unit 81.

By providing the power sources 82 and 83 as above, it is possible to separate power supplies for the control system and the communication system. The control unit 81 so controls the power source 82 of a PHS terminal to which a personal computer being capable of sending data at, for example, 1200 bps such that the power source 82 is switched on once a period of 100 msec or 625 osec, thereby saving the battery.

Figure 18:
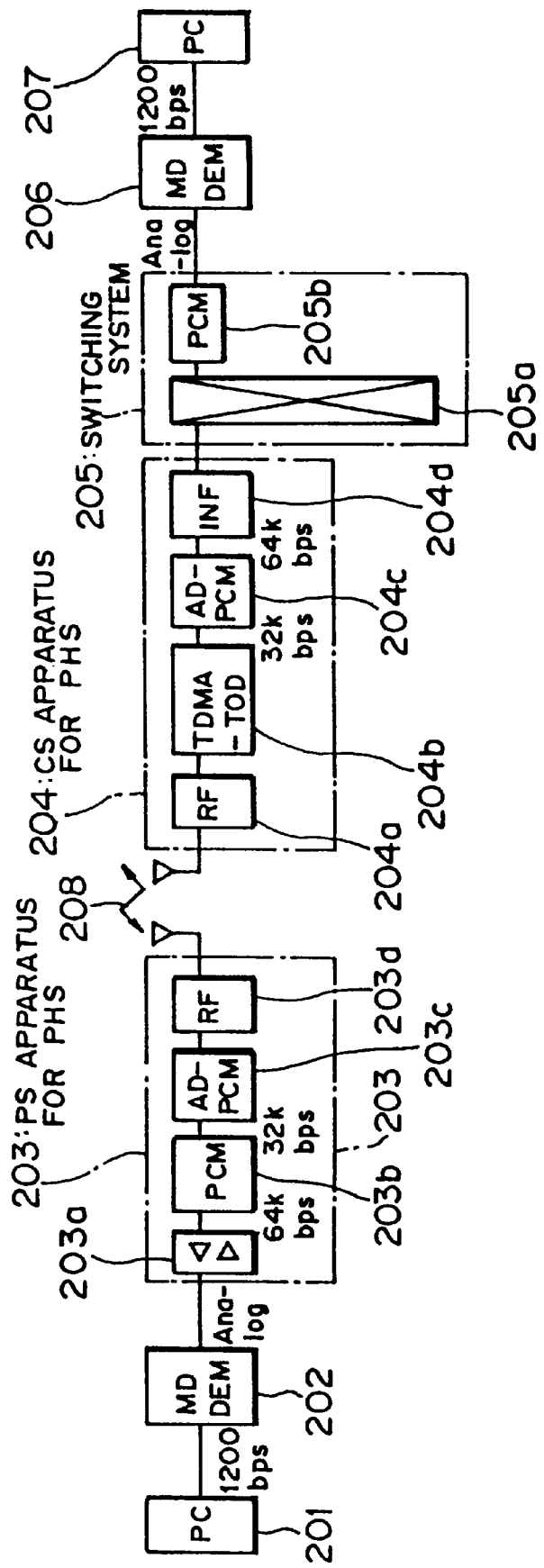
FIG. 18 is a block diagram showing the radio communication system if a data communication network is configured using a PHS as a mobile radio terminal.
Figure 19:
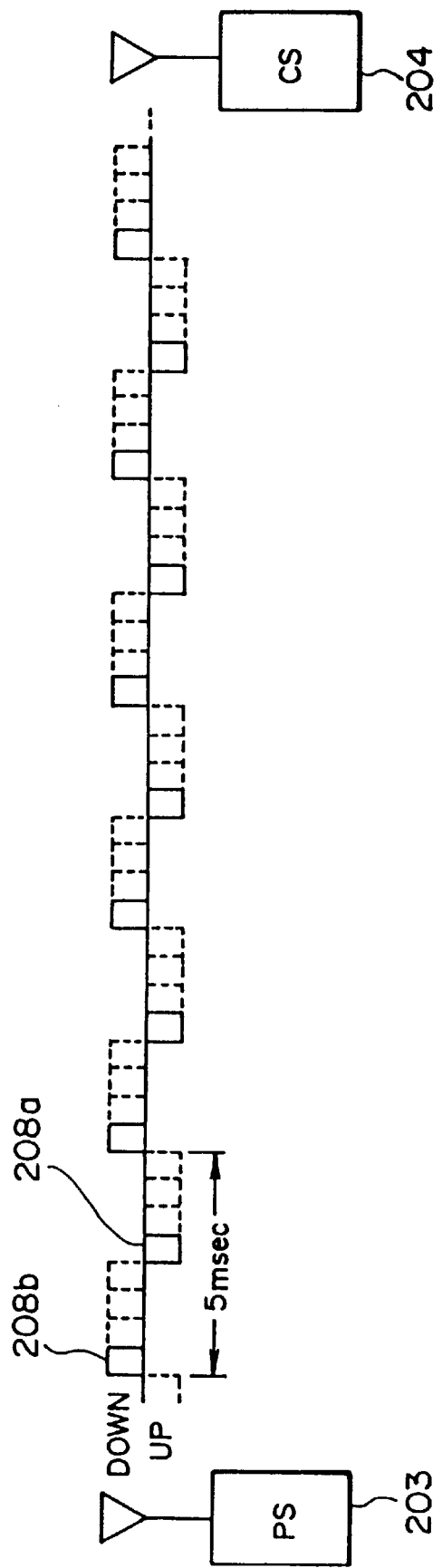
FIGS. 19 and 20 show assignment of slots on communication channels in a general radio communication system.

Incidentally, the PHS terminals 51-1, 52-1, 68-1 and 69-1 are not connected to personal computers, which are configured as mobile radio terminals for voice communication which perform only a voice communication process. The PHS terminals 51-1, 52-1, 68-1 and 69-1 have thus structures similar to the above-mentioned structure shown in FIG. 5 or the above-mentioned structure (refer to reference numeral 203) shown in FIG. 18.

Figure 6:
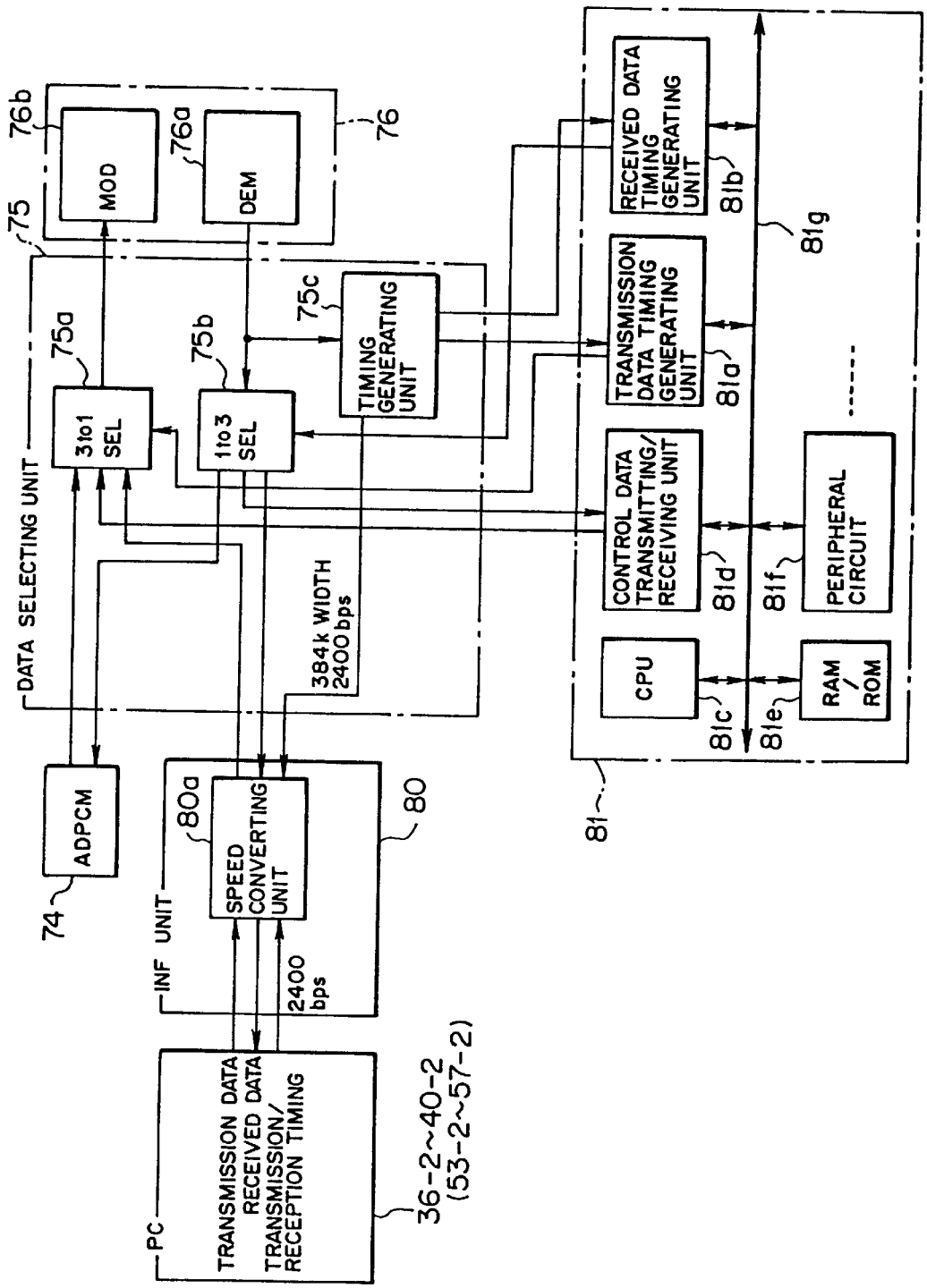
FIG. 6 is a block diagram showing an essential part of the PHS terminal according to the embodiment of this invention.

The data selecting unit 75, the INF unit 80 and the control unit 81 in each of the PHS terminals 36-1 through 40-1 (53-1 through 57-1) connected to the respective personal computers 36-2 through 40-2 (53-2 through 57-2) have structures shown in detail in FIG. 6.

As shown in FIG. 6, the INF unit 80 has a speed converting unit 80a. The speed converting unit 80a converts digital data (transmitted data and transmission/reception timing information) at a transmission speed of 2400 bps inputted from the personal computers 36-2 through 40-2 into data at a transmission speed in synchronization with the radio line 34, or converts digital data (received data) at a transmission speed in synchronization with the radio line 34 from the data selecting unit 75 into data at a transmission speed of 2400 bps.

Figure 7:
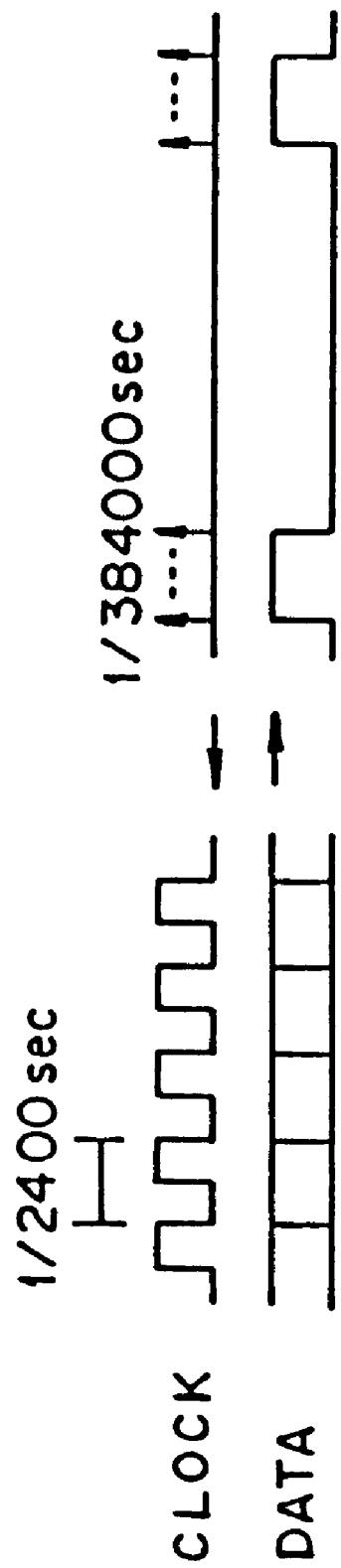
FIGS. 7(a) and 7(b) illustrate an operation of the PHS terminal according to the embodiment of this invention.

In other words, the speed converting unit 80a converts data at normal 2400 bps (whose clock cycle is $\frac{1}{2400}$ sec) shown in, for example, FIG. 7(*a*) into data at 2400 bps in width of 348 kbps (whose clock cycle is $\frac{1}{384000}$ sec) as shown in FIG. 7(*b*), or converts data at 2400 bps in width of 384 kbps into data at normal 2400 bps.

As shown in FIG. 6 in detail, the control unit 81 has a transmission data timing generating unit 81a, a received data timing generating unit 81b, a CPU 81c, a control data transmitting/receiving unit 81d, a storage apparatus 81e, a peripheral circuit 81f, etc., which are connected to each other via a bus 81g.

The transmission data timing generating unit 81a generates a timing of transmission of time-division multiplexed data. The received data timing generating unit 81b generates a timing of reception of time-division multiplexed data.

The CPU 81c collectively controls the entire control unit 81. The control data transmitting/receiving unit 81d transmits and receives control data over a control channel. The storage apparatus 81e stores data necessary when the control unit 81 controls, configured with a RAM, a ROM or the like.

The data selecting unit 75 has, as shown in FIG. 6 in detail, a transmission data selector 75a, a received data selector 75b and a timing generating unit 75c.

The transmission data selector 75a selects transmission signals (voice signals) from the ADPCM processing unit 74, transmission signals (data signals) from the INF unit 80, and control signals from the control data transmitting/receiving unit 81d on the basis of timing information from the transmission data timing generating unit 81a to form time-division multiplexed data, and outputs it to the modulator 76b.

The receiving data selector 75b is inputted thereto time-division multipexed data from the demodulator 76a, switches slot information configuring the time-division multiplexed data on the basis of timing information from the received data timing generating unit 81b and outputs it, thereby outputting voice signals to the ADPCM processing unit 74, outputting data signals to the INF unit 80, and outputting control signals to the control data transmitting/receiving unit 81d of the control unit 81.

The timing generating unit 75c extracts timing information from time-division multiplexed data from the demodulator 76a to generate control information used to generate a timing for the transmission data timing generating unit, 81a and the received data timing generating unit, 81b of the control unit 81.

The control unit 81 of each of the PHS terminals 36-1 through 40-1 (53-1 through 57-1) generates a timing of transmitting/receiving signals on the basis of the timing information extracted from the time-division multiplexed data transmitted from the PHS base station 31, thereby transmitting or receiving time-division multiplexed data.

Figure 8:
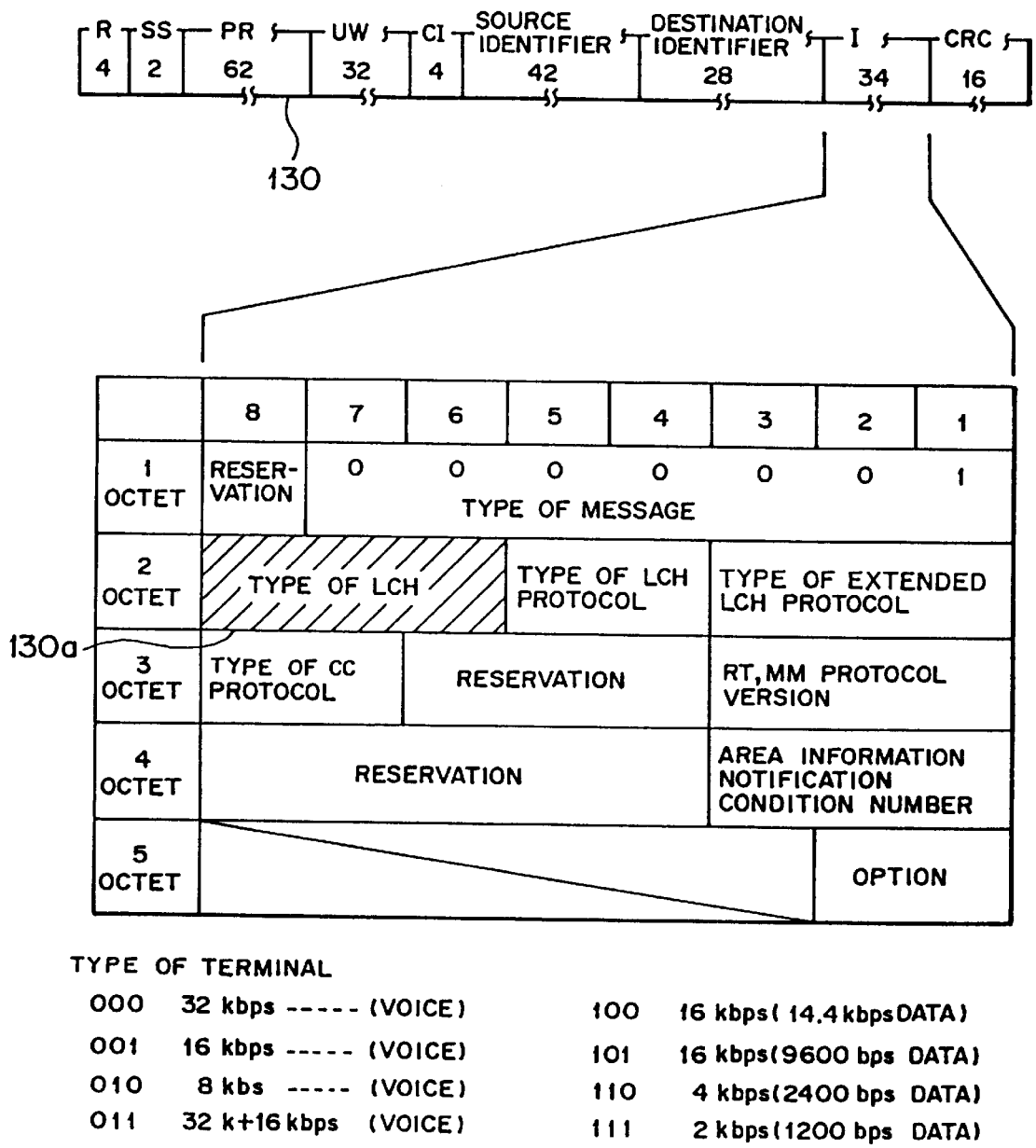
FIG. 8 shows a format of a control signal outputted from the PHS terminal over a control channel according to the embodiment of this invention.

If the INF unit 80 detects that a personal computer (for example, 36-2) is connected to its own PHS terminal (for example, 36-1), the control unit 81 outputs a control signal (a frame) 130 in a format as shown in, for example, FIG. 8 to the PHS base station 31 using a slot for the control channel. It is thereby possible to notify an LCH type 130a of three bits as terminal type information to the PHS base station 31.

If the above LCH type 130a is '000', the terminal is considered to transmit and receive voice signals at 32 kbps. If the LCH type 130a is '001', the terminal is considered to transmit and receive voice signals at 16 kbps. If the LCH type 130a is '010', the terminal is considered to transmit and receive voice signals at 8 kbps. If the LCH type 130a is '011', the terminal is considered to transmit and receive voice signals at 32 kbps and voice signals at 16 kbps.

Further, if the above LCH type 130a is '100', the terminal is considered to transmit and receive data signals at 14.4 kbps. If the LCH type 130a is '001', the terminal is considered to transmit and receive voice signals at 9600 bps. If the LCH type 130a is '010', the terminal is considered to transmit and receive voice signals at 2400 bps. If the LCH type 130a is '011', the terminal is considered to transmit and receive voice signals at 1200 bps and voice signals at 16 kbps.

The PHS base station 31 registers terminal type information in a local memory 125 described later, besides registering in the digital switching system 32 contents of control represented by the above control signal in a format of a signal used inside the digital switching system 32.

Incidentally, the PHS terminals 41-1 through 50-1 (58-1 through 67-1) are different from the above PHS terminals 36-1 through 40-1 in a point that the speed converting unit (refer to reference numeral 80a) is served to convert a communication speed of digital data from/to 1200 bps to/from a speed in synchronization with the radio line 34. The remaining of the structure of each of the PHS terminals 41-1 through 50-1 is basically the same as the PHS terminals 36-1 through 40-1.

Figure 9:
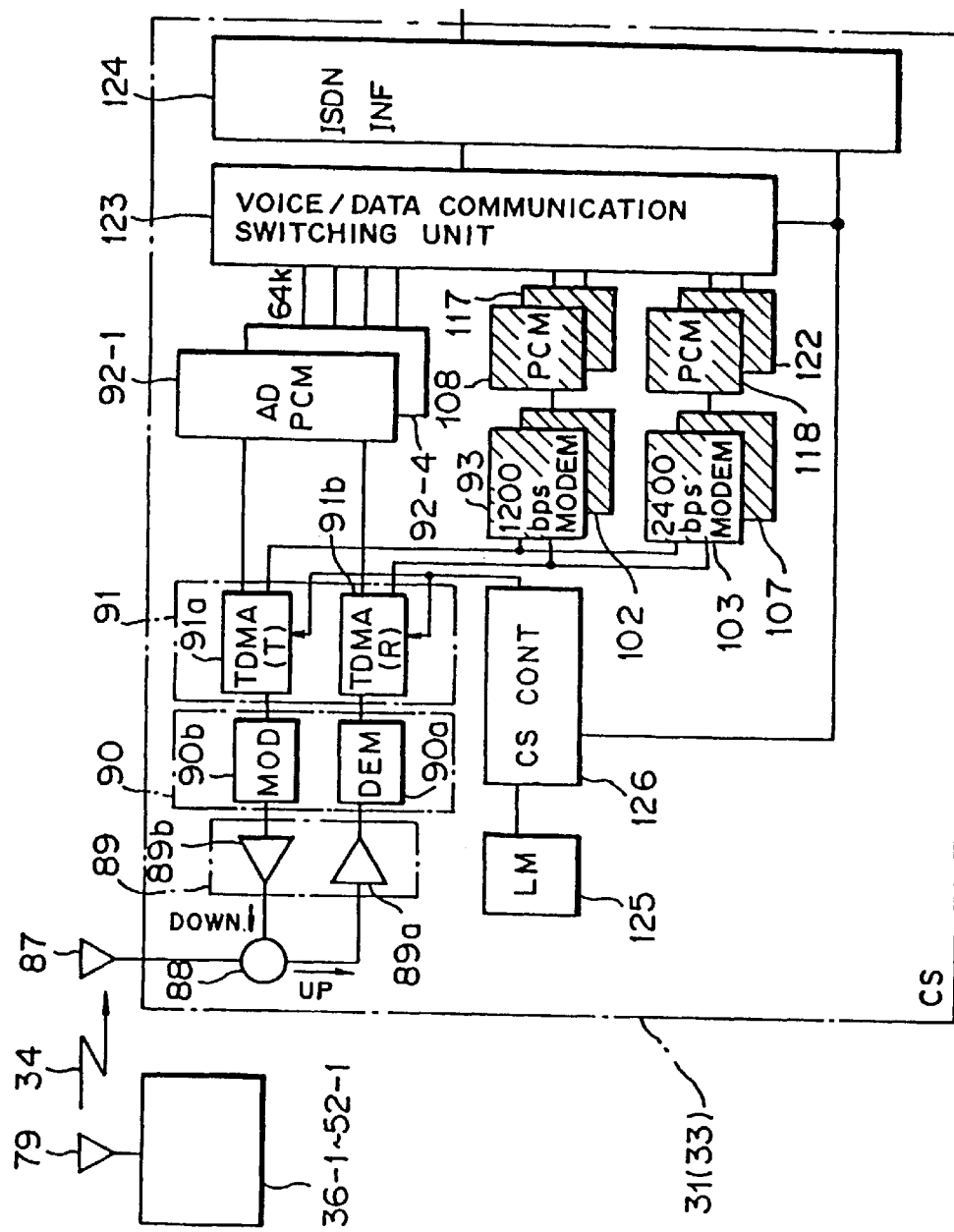
FIG. 9 is a block diagram showing a PHS base station according to the embodiment of this invention.

Each of the PHS base stations 31 and 33 has a structure shown in detail in FIG. 9. The structure of the PHS base station will be described by highlighting the PHS base station 31. Descriptions of a structure of the PHS station 33 are thus omitted.

In the PHS base station 31 (33) shown in FIG. 9, reference numeral 88 denotes a transmitting/receiving sharing unit.

The transmitting/receivign sharing unit 88 outputs up line signals received from the PHS terminals 36-1 through 50-1 (53-1 through 67-1) accommodated in the PHS base station 31 (33) over the radio line 34 to an amplifier 89a for the up line signals, besides transmitting down line signals as signals that should be transmitted to the PHS terminals accommodated in the PHS base station 31 (33) to the PHS terminals 36-1 through 50-1 via an antenna 87 over the radio line 34.

Reference numeral 89 denotes an amplifying unit. The amplifying unit 89 has the amplifier 89a for amplifying voice signals inputted from the transmitting/receiving sharing unit 88 as up line signals and outputting them to a modulating/demodulating unit 90, and an amplifier 89b for amplifying down line signals from the transmitting/receiving sharing unit 88 and outputting them to a time-division multiplexing/demultiplexing unit 91 described later.

The modulating/demodulating unit 90 has a demodulator (DEM) 90a for demodulating digital signals received via the amplifying unit 89 of, for example, the PHS base station 31, and a modulator (MOD) 90b for modulating down line signals configuring transmitting signals to a PHS terminal.

The time-division multiplexing/demultiplexing unit (TDMA; Time Division Multiple Access) 91 has a function to conduct a time-division multiplexing process on signals transmitted and received by the antenna 87, which is made up of a time-division multiplexing unit for reception [TDMA (R)] 91a and a time-division demultiplexing unit for transmission [TDMA (T)] 91b.

The time-division multiplexing unit 91a conducts a time-division multiplexing process on signals on plural channels (4 channels, for example) configuring down line signals as transmission signals to the PHS terminals accommodated in its own PHS base station 31.

The time-division demultiplexing unit 91b conducts a time-division demultiplexing process on received signals from the demodulator 90a to compress and convert the signals into independent digital data (voice signals or data signals) on, for example, four channels (three communication channels and one control channel) at a transmission speed of 32 kbps.

Reference numerals 92-1 through 92-4 denote four ADPCM (Adaptive Differential Pulse-Code Modulation) processing units. The ADPCM processing units (a voice communication processing system) 92-1 through 92-4 are connected to the time-division multiplexing/demultiplexing unit 91, which have functions as code expansion/compression processing units for expanding and compressing voice signals.

In practice, the ADPCM processing unit 92-1 through 92-4 are provided for respective channels (that is, the ADPCM processing units 92-1 through 92-4 connected to the time-division multiplexing/demultiplexing unit 91 are provided for four respective channels) to compress PCM coded signals (down line signals) at a transmission speed of 64 kbps from the digital switching apparatus 32 into signals at a transmission speed of 32 kbps in synchronization with the radio line 34, or expand signals (up line signals) at a transmission speed of 32 kbps from the time-division multiplexing/demultiplexing unit 91 into signals at 64 kbps.

In other words, the ADPCM processing units 92-1 through 92-4 expand data (up line signals) on respective four channels at 32 kbps demultiplexed by the time-division multiplexing/demultiplexing unit 91 into data at 64 kbps, thereby satisfying an interface condition in a direction toward the switching system (network) 32.

As to down data (down line signals), the ADPCM processing units 92-1 through 92-4 compress digitized voice signals at 64 kbps on four channels received from the network 32 to convert them into digital data at 32 kbps on four channels.

Reference numerals 93 through 107 denote low-speed modems. These low-speed modems 93 through 107 are connected in parallel to the time-division multiplexing/demultiplexing unit 91, which have functions as low-speed modulating/demodulating units to modulate and demodulate data signals at a processing speed lower than a processing speed of the ADPCM processing units 92-1 through 92-4.

In practice, the low-speed modems 93 through 102 modulate data signals (up line signals) from the time-division multiplexing/demultiplexing unit 91 at a speed of 1200 bps, and demodulate analog signals (down line signals) from PCM processing units 108 through 117 described later at a speed of 1200 bps.

Low-speed modems 103 through 107 modulate data signals (up line signals) from the time-division multiplexing/demultiplexing unit 91 at a speed of 2400 bps, and demodulate analog signals (down line signals) from PCM processing units 118 through 122 described later at a speed of 2400 bps.

Therefore, the above ten low-speed modems 93 through 102 are configured as low-speed modulating/demodulating units at the same processing speed, and the five low-speed modems 103 through 107 are configured as low-speed modulating/demodulating units at the same processing speed.

The PCM processing units 108 through 122 are correspondingly connected to the low-speed modems 93 through 107, which have functions as interface processing units for conducting an analog/digital converting process and a digital/analog converting process on data signals.

More specifically, these PCM processing units 108 through 122 encode modulated data (up line signals) from the low-speed modems 93 through 107 using a PCM technique, besides converting PCM coded modulated data (down line signals) from a voice/data communication switching unit 123 described later into analog modulated data.

In consequence, the above low-speed modems 93 through 107 and the PCM processing units 108 through 122 configure a data communication processing system for processing data signals.

Reference numeral 123 denotes the voice/data communication switching unit. The voice/data communication switching unit 123 selectively switches the ADPCM processing units 92-1 through 92-4, the PCM processing units 108 through 117 and the PCM processing units 118 through 122 on the basis of a switching control signal from, for example, a control unit 126 described later.

Reference numeral 124 denotes an ISDN interface unit. The ISDN interface unit 124 functions as an interface between the PHS base station 31 (33) and the digital switching system 32.

A local memory (LM, Local Memory) 125 has a function as a storing unit for storing data as to whether a PHS terminal is a mobile radio terminal for voice communication or a mobile radio terminal for data communication upon registration of a location of each of the PHS terminals 36-1 through 52-1 (53-1 through 69-1).

In other words, the local memory 125 registers terminal discrimination information on the basis of an LCH type 130a included in a control signal 130 configured, for example, in a format as shown in the above FIG. 8 fed from the control unit 81.

In practice, upon registration of a location of each of the PEIS terminals 36-1 through 50-1 (53-1 through 67-1), the local memory 125 registers its terminal type information (a mobile radio terminal for data communication). When a location of each of the PHS terminals 51-1 through 52-1 (68-1 and 69-1), the local memory 125 registers its terminal discriminating information (a mobile radio terminal for voice communication).

Data stored in the local memory 125 is used by the control unit 126 described later as data used for selecting either a path of a communication channel via the low-speed modems 93 through 107 and the PCM processing units 108 through 122 or a path of a communication channel via the ADPCM processing units 921 through 92-4 between the time-division multiplexing/demultplexing unit 91 and the ISDN interface unit 124.

Namely, the control unit (CS CONT) 126 controls assignment of communication channels with the PHS terminals 36-1 through 52-1 by transmitting control channel information to the PHS terminals 36-1 through 52-1 via the time-division multiplexing/demultiplexing unit 91 and the antenna 87 in response to a demand from the network or outputting a switching control signal to the time-division multiplexing/demultiplexing unit 91 and the voice/data communication switching unit 123 on the basis of stored information in the local memory 125.

In other words, by outputting a switching control signal to the time-division multiplexing/demultiplexing unit 91 and the voice/data communication switching unit 123 on the basis of stored information in the local memory 125, the control unit 126 selects either a path for a communication channel via the low-speed modems 93 through 107 and the PCM processing units 108 through 122 or a path for a communication channel via the ADPCM processing units 921 through 92-4 between the time-division mutliplexing/demultiplexing unit 91 and the interface unit 124 so as to control the assignment.

Figure 10:
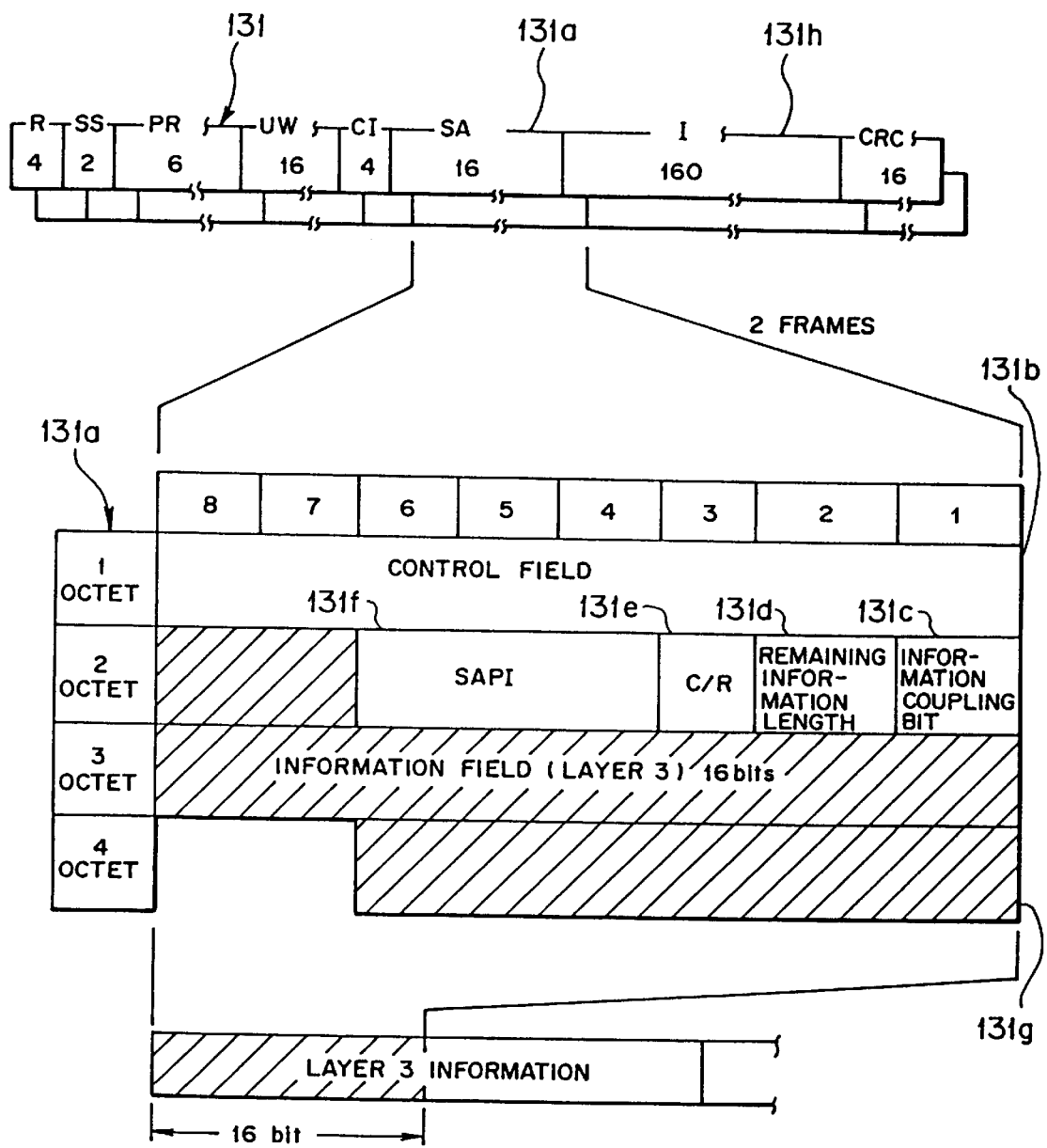

As a signal 131 on a communication channel outputted from the control unit 81 of each of the PHS terminals 36-1 through 52-1 (53-1 through 69-1), signal (a frame) 131 in a format as shown in, for example, FIG. 10 are used. In particular, two slots of a region (SA region) 131a of 16 bits in the format shown in FIG. 10 are assigned as a unit for control data for the low-speed modems 93 through 107 in the PHS base station 31 (33).

By using two 16-bit regions as shown in FIG. 10, a region 131b of the first one octet is used as a control field, the first one-bit region 131c in the second octet is used for an information coupling bit, a region 131d of the following one bit is used for a remaining information length, a region 131e of the following one bit is used for C/R information, a region 131f of the following three bits are used for SAPI information, and a region 131g of the remaining sixteen bits is used as an information field in a layer 3.

The information field 131g in the layer 3 consisting of the above remaining 16 bits has a structure as shown in FIG. 11.

When the signals 131 on the communication channel in the format shown in FIG. 10 is received by the PHS base station 31 (33) CS apparatus, an I field 131h of 160 bits on this communication channel is converted into an appropriate speed by the time-division multiplexing/demultiplexing unit 91 and inputted to the low-speed modems 93 through 107.

Figure 12:
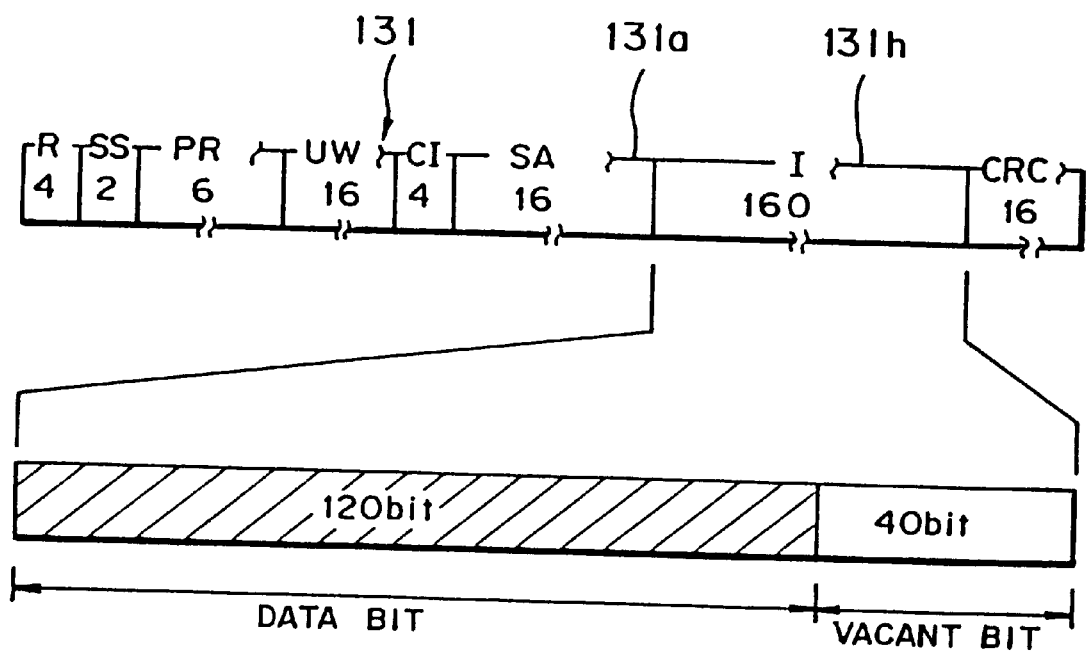

When data signals at 1200 bps are transmitted as data bits of the signals 131 on the above communication channel, for example, 200 frames of the 160-bit I field 131h are used. By using only 120 bits among the 160 bits as shown in FIG. 12, a communication speed n times 1200 bps is available.

Modem control information from the personal computers 36-2 through 50-2 (53-2 through 67-2) is received from the SA region 131a on the communication channel and transferred from the time-division multiplexing/demultiplexing unit 91 to the control unit 126.

The control unit 126 receives information from the personal computers 36-2 through 50-2 connected to the respective PHS terminals 36-1 through 50-1 so as to control the low-speed modems 93 through 107.

An operation of the radio communication system with the above structure according to the embodiment of this invention will be described below with reference to FIGS. 13 through 17.

i) Description of a Process of Registering a Type of a Terminal

Figure 13:
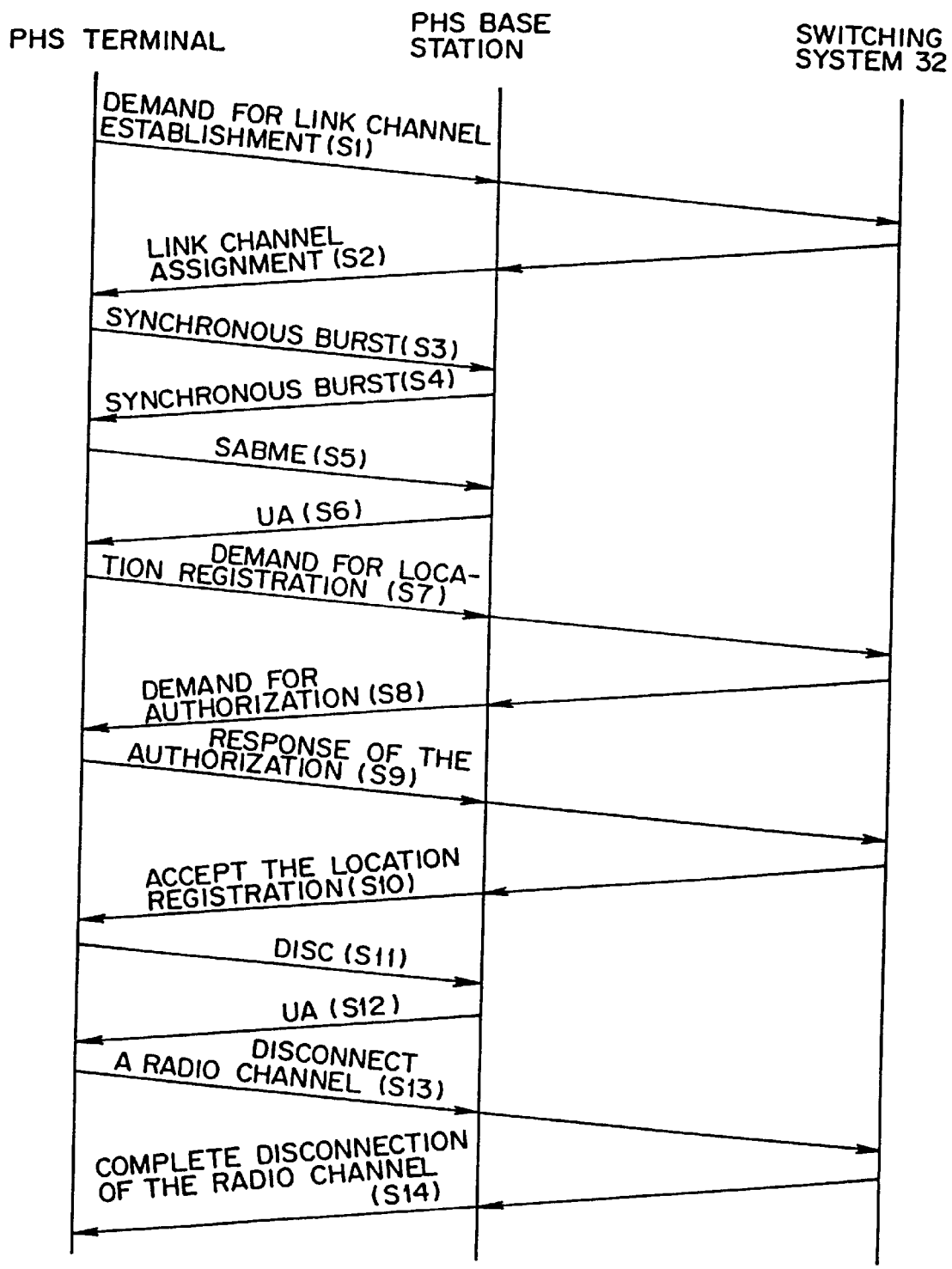
FIG. 13 is a signal sequence diagram for illustrating exchanges of signals when a type of a terminal is registered according to the embodiment of this invention.

As shown in FIG. 13, for example, upon registration of locations of the PHS terminals 36-1 through 69-1 in a stage preceding a calling/terminating process between the PHS terminals 36-1 through 69-1, it is recognized whether each of the PHS terminals 36-1 through 69-1 is a mobile radio terminal for voice communication or a mobile radio terminal for data communication.

Namely, a link channel establishment demanding signal (a signal S1 in FIG. 13) and a link channel assigning signal (a signal S2 in FIG. 13) are exchanged between the PHS terminal 36-1, . . . or 52-1 (53-1, . . . or 69-1) and the digital switching system 32, after that, a synchronous burst signal (signals S3 and S4 in FIG. 13), an SABME (Set Asynchronous Balanced Mode Extended) signal (a signal S5 in FIG. 13) and a UA (Unnumbered Acknowledge) signal (a signal S6 in FIG. 13) are exchanged between the PHS terminal 36-1, . . . or 52-1 (53-1, . . . or 69-1) and the PHS base station 31 (33).

After that, the PHS terminal 36-1, . . . or 52-1 (53-1, . . . 69—i) makes a location registering demand to the digital switching system 32 (a signal S7 in FIG. 13). The digital switching system 32 outputs an authorizing demand to the PHS terminal 36-1, . . . or 52-1 (53-1, . . . 69—i) (a signal S8 in FIG. 13).

Following that, when the PHS terminal 36-1, . . . or 52-1 (53-1, . . . or 69-1) outputs a response to this to the digital switching system 32 (a signal S9 in FIG. 13), the location registering demand from the PHS terminal 36-1, . . . or 52-1 (53-1, . . . or 69-1) is accepted (a signal S10 in FIG. 13).

In particular, when the INF unit 80 detects that a personal computer 36-2, . . . or 50-2 (53-2, . . . or 67-2) is connected while a power source of the PHS terminal 36-1, . . . or 50-1 (53-1, . . . 67-1) is on-state, the control unit 81 normally registers a location in the PHS base station 31 (33) (signals S1 through S10) and registers a type of the terminal, in addition.

When a type of the terminal is registered, the control unit 81 outputs a signal in the above-mentioned format shown in FIG. 8 to the control unit 126 of the PHS base station 31 (33), whereby the local memory 125 stores this terminal type information.

Following that, when the digital switching system 32 outputs an acceptance of the location registration to the PHS terminal 36-1, . . . or 50-1 (53-1, . . . or 67-1), the PHS terminal 36-1, . . . or 50-1 (53-1, . . . or 67-1) exchanges a DISC (Disconnect) signal (a signal S11) and a UA (Unnumbered Acknowledge) signal (a signal S12) with the PHS base station 31 (33).

After that, a radio channel disconnecting signal (a signal S13) and a radio channel disconnection completion signal (a signal S14) are exchanged between the PHS terminal 36-1, . . . or 50-1 (53-1, . . . or 67-1) and the digital switching system 32, then exchange of signals at the time of registration of a terminal type is completed.

ii) Description of the First Mode of Setting Section Channels for Data Communication If a normal calling is set after registration of a terminal type as above, a normal voice communication or a data communication is implemented depending on a type of a destination PHS terminal.

If the PHS terminal 58-1 accommodated in the PHS base station 33 makes a demand for call setting to the PHS terminal 41-1, for example, the digital switching system 32 notifies a message of a terminating demand to the PHS base station 31 accommodating the PHS terminal 41-1 regardless of a terminal type of the destination PHS terminal 41-1.

The control unit 126 of the PHS base station 31 having received the message of a terminating demand from the digital switching system 32 examines as to whether the destination PHS terminal 41-1 is a mobile radio terminal for voice communication or a mobile radio terminal for data communication on the basis of contents of the local memory 125.

If the control unit 126 judges that the destination PHS terminal is a mobile radio terminal for voice communication, a path through which voice data is outputted to the ISDN interface unit 124 via any one of the ADPCM processing units 92-1 through 92-4 is set by a switching control signal outputted from the time-division multiplexing/demultiplexing unit 91. A normal communication channel of one channel (whose transmission speed is 32 kbps) is assigned for communication between the PHS terminal 58-1 and the PHS terminal 41-1.

If the destination PHS terminal 41-1 is a mobile radio terminal for data communication like the destination PHS terminal 41-1, the control unit 126 of the PHS base station 31 accommodating the destination PHS terminal 41-1 controls the voice/data communication switching unit 123 to select a path for data communication via any one of the PCM processing units 108 through 122 and any one of the low-speed modems 93 through 107 for received data from the digital switching system 32.

In this case, the personal computer 41-2 connected to the destination PHS terminal 41-1 can send data at 1200 bps. Therefore, the control unit 126 of the PHS base station 31 outputs a switching control signal to the voice/data communication switching unit 123 so as to select a path via, for example, the low-speed modem 103 and the PCM 118.

The control unit 126 of the PHS base station 33 accommodating the origination PHS terminal 58-1 recognizes that the PHS terminal 58-1 is a mobile radio terminal for data communication on the basis of contents of the local memory 125. Namely, the control unit 126 controls the time-division multiplexing/demultiplexing unit 91 so as to select a path for data communication via any one of the PCM processing units 108 through 122 and any one of the low-speed modems 93 through 107 inside the PHS base station 33.

The personal computer connected to the origination PHS terminal 58-1 can send data at 1200 bps. The control unit 126 of the PHS base station 33 controls the time-division multiplexing/demultiplexing unit 91 so as to select a path via, for example, the low-speed modem 103 and the PCM 118.

When a call is established between the PHS terminal 58-1 and the PHS terminal 41-1 as above, the control unit 81 of the origination PHS terminal 41-1 implements transmission and reception over a signal line to and from the personal computer 58-2 under a software control as if the personal computer 58-2 is connected to a low-speed modem.

Namely, the control unit 81 causes the data selecting unit 75 to multiplex communication data from the personal computer 58-2 and control data of the low-speed modem 103 from the control unit 81 on a communication channel under a software control, and notifies the multiplexed data to the PHS base station 33.

In consequence, the control unit 81 remotely controls the low-speed modem assigned inside the PHS base station 33, and the control unit 126 and the control unit 81 control slot assignment at the time of transmission and reception of data signals, at the same time.

Figure 14:
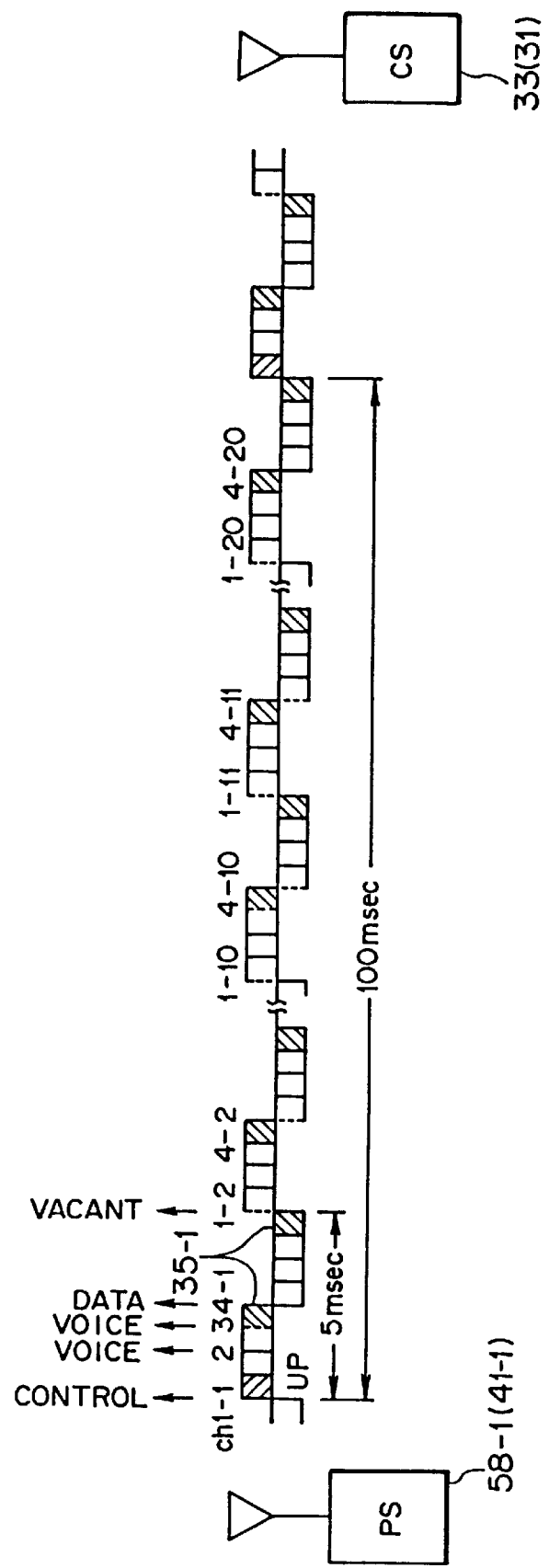
FIG. 14 shows assignment of slots multiplexed in a time-division fashion on a radio line according to the embodiment of this invention.

When a mobile radio terminal for data communication such as the above PHS terminal 58-1 (41-1) and the PHS base station 33 (31) communicate with each other over the radio line 35 (34), one channel (a slot number '4') is assigned to be used for data communication, and another one channel (a slot number '1') is assigned to be used as a control channel, and the remaining two channels (slot numbers '2' and '3') are assigned to be used as communication channels for voice communication out of slots for four channels at the time of voice communication as shown in FIG. 14 or 15, for example.

By assigning a usable slot at the time of communication between the PHS terminal 58-1 and the PHS terminal 41-1 to the slot '4', it is possible to set a calling even between another mobile radio terminals for data communication.

In other words, at the time of transmission and reception of voice signals, one slot is assigned per 5 msec as the first period as to a communication channel to implement communication using voice signals. On the other hand, at the time of transmission and reception of data signals, plural slots are assigned per 100 msec as the second period longer than 5 msec as to a communication channel to implement communication using data signals.

In a case shown in FIG. 14, 5 msec is assigned per unit slot. Plural slots are assigned per 100 msec to implement communication of data signals. It is therefore possible to prepare up to 20 kinds of slots for data communication so that up to 20 paths may be assigned at the time of data communication.

In practice, a slot 35-1 (a slot number '4-1') shown in FIG. 14 is assigned as a usable slot at the time of communication among the PHS terminal 58-1 and the PHS terminal 41-1, whereby the remaining 19 slots at the slot number '4' (slot numbers '4-2' through '4-20') may be assigned as usable slots at the time of communication between another 19 sets of mobile radio terminals for data communication.

In consequence, it is possible to increase the number of usable channels in the case of transmission and reception including data signals as compared with transmission and reception of voice signals.

If 20 paths are assigned on a communication channel used for data communication in this case (in the case where 20 calls are set by assigning 20 slots during a period of 100 msec), a transmission speed of an assigned slot unit is 1600 bps. In particular, at the time of data communication between 20 pairs of personal computers being able to send data at 1200 bps, it is possible to assign usefully at a practical transmission speed (32 kbps).

In this case, 20 sets of PHS terminals connected to respective personal computers being able to send data at 1200 bps are provided, and 20 low-speed modems and 20 PCM processing units are connected in parallel between the time-division multiplexing/demultiplexing unit 91 and the voice/data communication switching unit 123 similarly to the above modems 93 through 107 and the PCM processing units 108 through 122, thereby setting 20 paths for data communication.

In the above PHS base station 31 (33), all four channels of the radio line 34 (35) are connected for voice communication and four paths via the ADPCM processing units 92-1 through 92-4 are selected, thereby implementing voice communications among the PHS terminals as four pairs of mobile radio terminals for voice communication. However, one channel out of the four channels is assigned for data communication, thereby providing a data line of up to 20 channels to a radio section along with a voice line of three channels as stated above.

Accordingly, the number of lines connected to the network is up to 23 lines (64 kbps), and thus it is possible to suitably set the number of network lines having 0 through 23 channels in the ISDN interface unit 124 in the case of a system structure in the above distribution.

In the above control unit 81 and the control unit 126, it is possible to alter the number of assigned slots depending on a transmission speed of data signals.

If data communication is implemented using the PHS terminal 53-1 connected to the personal computer 532 which can send data at 2400 bps, for example, two slots out of slots numbered '4' at an interval of 100 msec are assigned as usable slots at the time of communication using the PHS terminal 53-1 so as to assure a transmission speed on the radio line 35.

Figure 16:
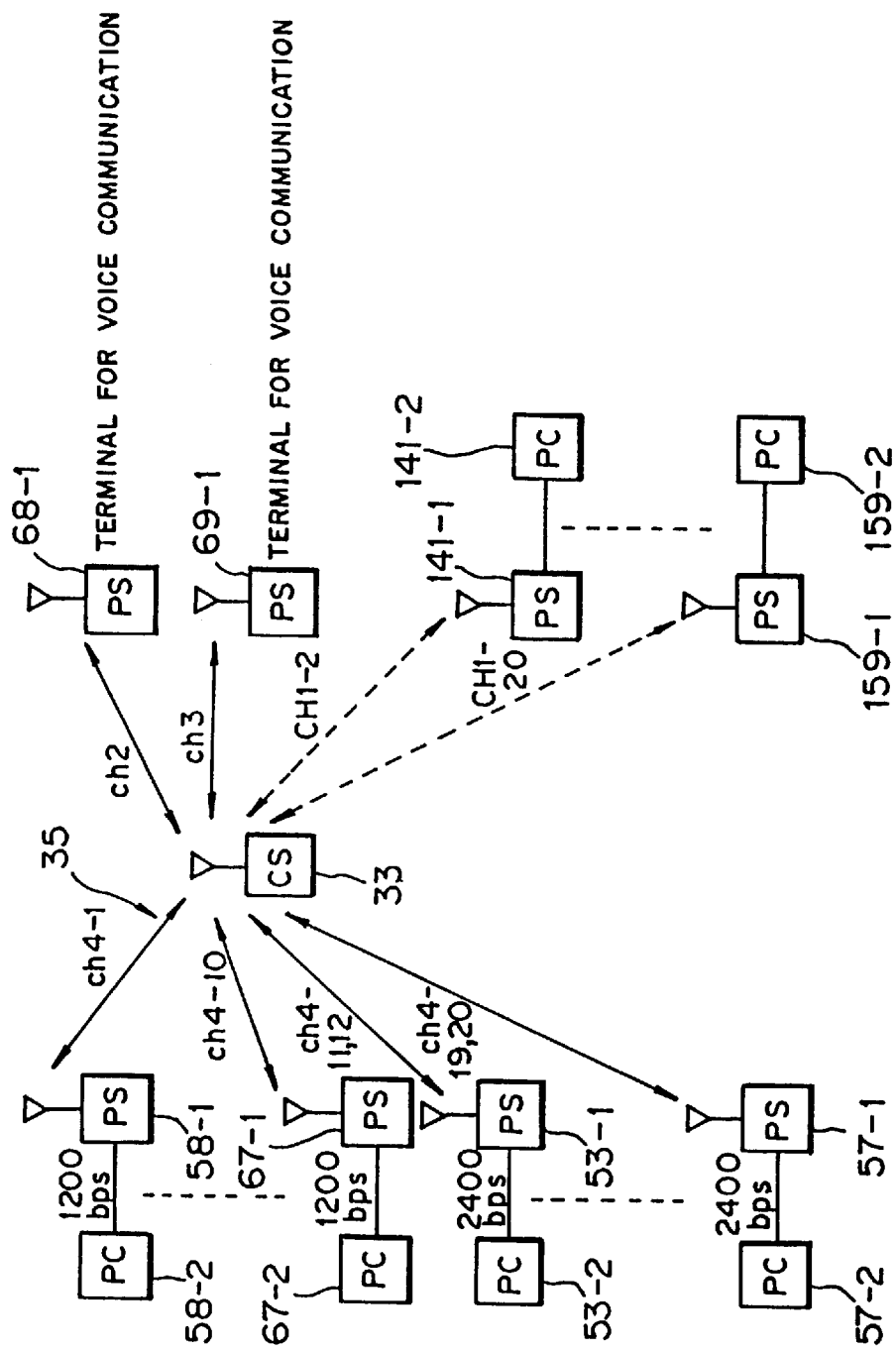
FIG. 16 illustrates an operation of a radio communication system according to the embodiment of this invention.

In this case, data communication is feasible over a channel (the slot number 4) for data communication using the PHS terminals 58-1 through 67-1 connected to the respective personal computers 58-2 through 67-2 which can send data at 1200 bps and the PHS terminals 53-1 through 57-1 connected to the respective personal computers 53-2 through 57-2 which can send data at 2400 bps as shown in FIG. 16, for example. In addition, voice communication is feasible using two PHS terminals 68-1 and 69-1 over the remaining two communication channels.

Namely, the PHS base station 33 allows communication over up to 17 lines of voice communication lines and data communication lines.

iii) Description of the Second Mode of Setting Section Channels for Data Communication In the above first mode of setting, one channel (the slot '1') out of slots for four channels in the case of voice communication is used as a control channel. A section channel for data communication is set by using communication channels excepting the control channel. In this mode, communication of data signals is implemented at a timing of vacant slots on the above-mentioned control channel so as to set a section channel for data communication.

A slot (up/down line data) on a control channel over which control information is exchanged among, for example, the PHS terminal 58-1, the PHS base station 33 and the digital switching system 32 is transmitted per 100 msec intermittently as compared with the minimum transmission/reception cycle (5 msec) as mentioned above with reference to FIG. 20.

Figure 20:
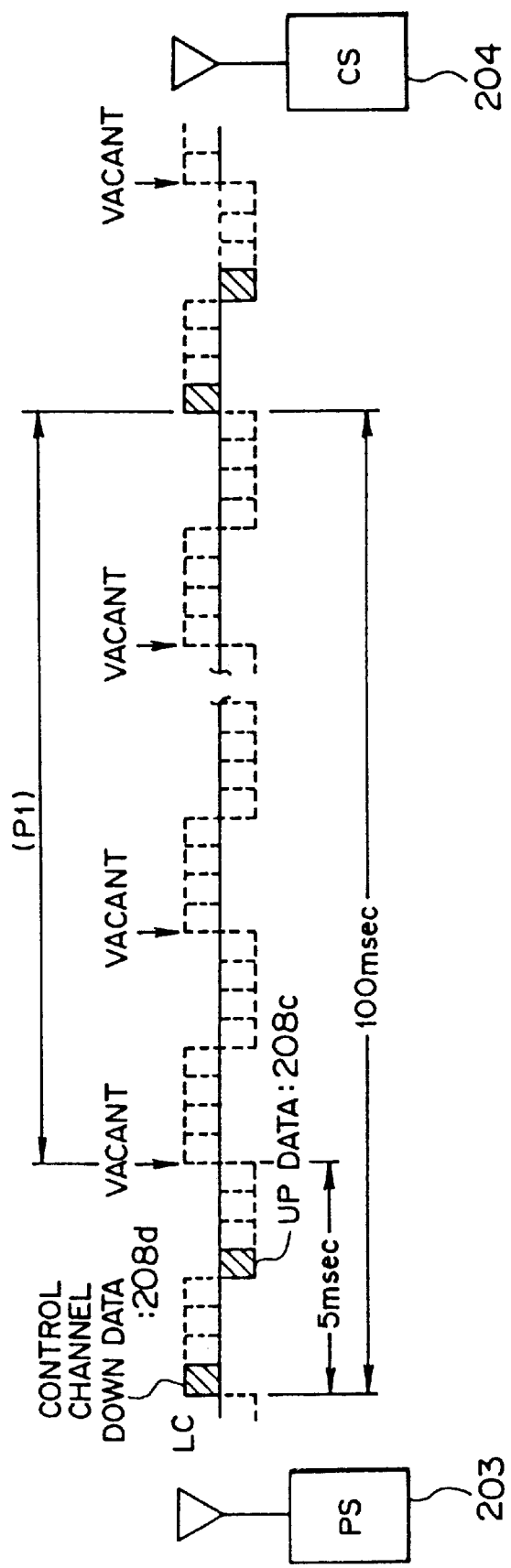

In the PHS base station 33, the control unit 126 controls the time division multiplexing/demultiplexing unit 91 to implement time-division multiplexing at a timing of vacant slots on the above control channel [at the time of 19 vacant slots on the control channel in a section (P1) in FIG. 20], and causes an interface circuit to the low-speed modems 93 through 107 to be turned on, whereby data signals may be outputted to the digital switching system 32 at a timing of vacant slots on the control channel. Data communication is thus feasible at a timing of vacant slots on the control channel.

In the PHS terminal 58-1, the control unit 81 also causes an interface circuit with the INF unit 80 to be turned on at a timing of vacant slots on the control channel by controlling a selection control timing by the data selecting unit 75. It is thereby possible to output data signals to the PHS base station 33 at a timing of vacant slots on the control channel so as to implement data communication at a timing of vacant slots on the control channel.

As shown in FIG. 16, it is, for example, possible to additionally provide PHS terminals (mobile radio terminals for data communication) 141-1 through 159-1 as PHS terminals accommodated in the PHS base station 33, to which personal computers 141-2 through 159-2 being able to send data at 1200 bps are connected, respectively, other than the above PHS terminals 53-1 through 69-1, and connect 19 low-speed modems at 1200 bps and 19 PCM processing units in parallel between the time-division multiplexing/demultiplexing unit 91 and the voice/data communication switching unit 123.

Figure 17:
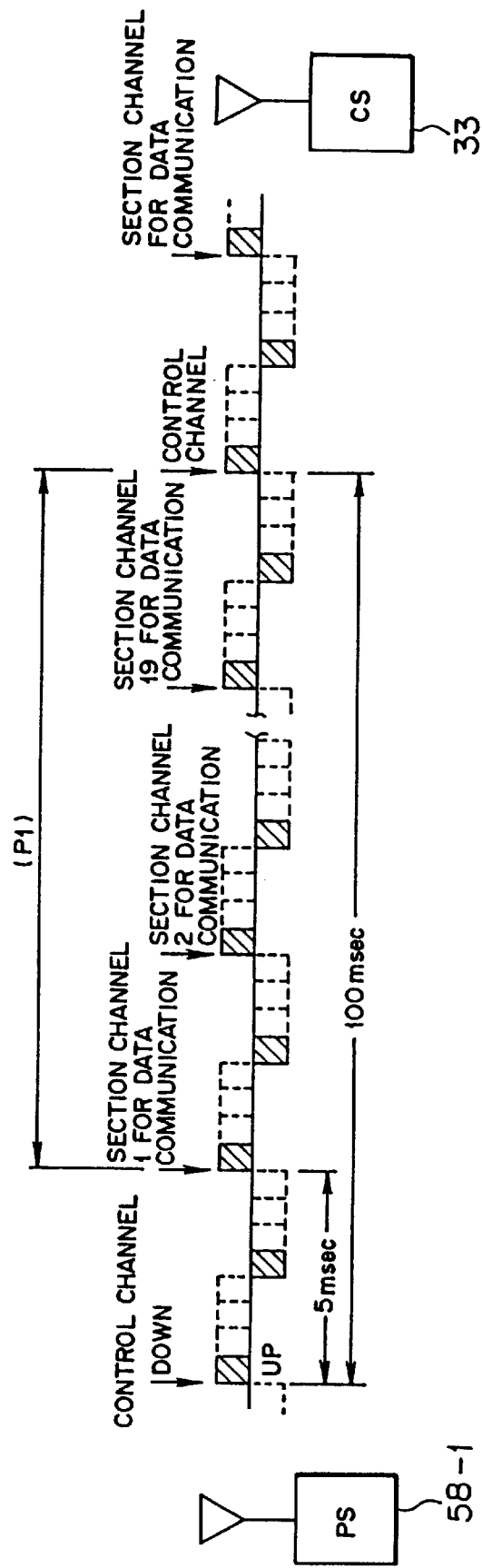
FIG. 17 shows assignment of slots multiplexed in a time-division fashion on the radio line according to the embodiment of this invention.

At a timing of vacant slots on the control channel shown in FIG. 20 as above, slots used for data communication using the PHS terminals 141-1 through 159-1 are inserted on the section channels for data communication 1 through 19 as shown in FIG. 17, whereby data communication over up to 19 lines becomes feasible.

In other words, 19 slots existing on one channel for every 100 msec shown in FIG. 20 are used as a section channel for data communication. It is thereby possible to provide up to 19 lines using vacant slot timings on the control channel in addition to the above-mentioned 15 lines in data communication.

As above, in the radio communication system according to the embodiment of the present invention, the low-speed modems 93 through 107 are provided in the PHS base station 31 (33), and local memory 125 and the control unit 126 connect a path including these low-speed modems 93 through 107 in a time-division fashion and according to a type of a terminal when a data communication is demanded. It is thereby possible to divide a way of use of the communication channels and the control channel into data communication purpose and voice communication purpose so as to improve a throughput or an efficiency of utilization of the line. In addition, it is possible to increase an apparent capacity of a communication line at the time of data communication, in particular, so as to efficiently configure a radio data communication network by means of a radio communication system such as personal computer communication, radio LAN, etc.

The plural low-speed modems 93 through 107 can set plural data communication lines using a communication channel. It is therefore possible to efficiently use equipments such as modems and the like in the system complying with a transmission speed of a connected PHS terminal.

Further, the control unit 81 can manage a condition of connection to the personal computer. In particular, the control unit 81 can control the power source to be turned on based on a condition of connection to the personal computer. It is thereby possible to contribute to power saving by saving a battery of the PHS terminal.

The voice/data communication switching unit 123 may set a route of an interface at 64 kbps to the network via the ADPCM processing units 92-1 through 92-4 or the PCM processing unit 108 through 122, thereby setting a line for voice communication and a line for data communication without spoiling a normal function of the PHS base station.

Registration information as to a type of a terminal notified to the PHS base station and the network from the PHS terminal when the power source is turned on may be the same as information handled in the normal PHS system.

Therefore, any alteration in a hardware and software in the system on the network side is unnecessary. In addition, this invention may apply to a general PHS system so as to decrease a cost of configuring the system.

According to the present invention, the number of PHS terminals as mobile radio terminals accommodated in the PHS base station, the number of lines for data communication which can be set simultaneously, and transmission speeds of data which can be send out from personal computers are not limited to the above examples described in this embodiment, thus various ones may be applied. In this case, if the low-speed modems 93 through 107 are at a variable rate, the communicable number of personal computers, that is, the number of lines for data communication is considered to be more increased.

What is claimed is:

1. A base station apparatus for a radio communication system for communicating with a mobile radio terminal over a radio line comprising:

a voice communication processing system for processing voice signals, a data communication processing system for processing data signals, said data communication processing system including a low-speed modulating/demodulating unit for modulating and demodulating said data signals at a processing rate lower than a processing rate of said voice communication processing system;

a storing unit for storing communication type discrimination information about which type of communication the mobile radio terminal intends to selectively perform among voice communication and data communication with said base station; and a voice/data communication switching unit for making a switchover between said voice communication processing system and said data communication processing system based on said communication type discrimination information stored in said storing unit.

2. The base station apparatus for a radio communication system according to claim 1, wherein said low-speed modulating/demodulating unit is composed of a plurality of low-speed modulating/demodulating units.

3. The base station apparatus for a radio communication system according to claim 2, wherein said plurality of low-speed modulating/demodulating units are equal in processing speed to one another.

4. The base station apparatus for a radio communication system according to claim 2, wherein at least a part of said plurality of low-speed modulating/demodulating units are different in processing speed from each other.

5. A base station apparatus for a radio communication system for communicating with a mobile radio terminal over a radio line comprising;

a voice communication processing system for processing voice signals and a data communication processing system for processing data signals;

said data communication processing system including:

a low-speed modulating/demodulating unit for modulating and demodulating said data signals at a processing rate lower than a processing rate of said voice communication processing system, and a storing unit for storing data as to whether said mobile radio terminal is a mobile radio terminal for voice communication or a mobile radio terminal for data communication at the time of location registration of said mobile radio terminal.

6. A base station apparatus for a radio communication system for communicating with a mobile radio terminal over a radio line, and being connected to a digital switching network comprising:

a time-division multiplex processing unit for conducting a time-division multiplexing process on signals transmitted and received by an antenna;

a code expansion/compression processing unit being connected to said time-division multiplex processing unit to conduct an expanding/compressing process on voice signals;

a low-speed modulating/demodulating unit being connected to said time-division multiplex processing unit to conduct a modulating/demodulating process on data signals at a processing speed lower than a processing speed of said code expansion/compression processing unit;

an interface processing unit being connected to said low-speed modulating/demodulating unit to conduct an analog/digital converting process and a digital/analog converting process on said data signals;

a voice/data communication switching unit for selectively switching said code expansion/compression processing unit or said interface processing unit;

a storing unit for storing data as to whether said mobile radio terminal is a mobile radio terminal for voice communication or a mobile radio terminal for data communication at the time of location registration of said mobile radio terminal; and a control unit for transmitting control channel information to said mobile radio terminal through said time-division multiplex processing unit and said antenna in response to a demand from a network, and controlling assignment of communication channels between said base station apparatus and said mobile radio terminals on the basis of stored information in said storing unit.

7. The base station apparatus for a radio communication system according to claim 6, wherein said code expansion/compression processing unit is configured with plural code expansion/compression units, said low-speed modulating/demodulating unit is configured with plural low-speed modulating/demodulating units, and said interface processing unit is provided correspondingly to each of said low-speed modulating/demodulating units.

8. The base station apparatus for a radio communication system according to claim 7, wherein said plural low-speed modulating/demodulating units are low-speed modulating/demodulating units at the same processing speed.

9. The base station apparatus for a radio communication system according to claim 7, wherein at least a part of said plural low-speed modulating/demodulating units are at processing speeds different from each other.

10. A mobile radio terminal for a radio communication system for communicating with a base station apparatus over a radio line comprising:

a voice communication processing unit for processing voice signals;

a data communication processing unit for processing data signals;

a control unit for generating control data including at least location registration data to said base station apparatus; and a switching unit for selectively switching said voice communication processing system, said data communication processing system or said control unit.

11. The mobile radio terminal for a radio communication system according to claim 10, wherein when a data terminal is connected to said mobile radio terminal, said control unit outputs an effect of this as control data.

12. The mobile radio terminal for a radio communication system according to claim 10, wherein said control unit so controls as to cause a power source to be turned on only when said data communication processing system operates.

13. A radio communication system having a base station apparatus and a mobile radio terminal communicating with each other over a radio line comprising:

said base station apparatus comprising;
 a base station voice communication processing system for processing voice signals;
 a base station data communication processing system for processing data signals;
 said base station data communication processing system comprising;
  a low-speed modulating/demodulating unit for conducting a modulating/demodulating process on said data signals at a processing speed lower than a processing speed of said base station voice communication processing system;
  an analog/digital converting unit being connected to said low-speed modulating/demodulating unit to conduct an analog/digital converting process on said data signals;
said mobile radio terminal comprising;
 a radio terminal voice communication processing system for processing voice signals;
 a radio terminal data communication processing system for processing data signals;
 a control unit for generating control data including at least location registration data to said base station apparatus; and
 a switching unit for selectively switching said radio terminal voice communication processing system, said radio terminal data communication processing system or said control unit.

14. A communicating method in a radio communication system having a base station apparatus and a mobile radio terminal communicating with each other over a radio line having a communication channel and a control channel comprising the steps of:

assigning one slot for every first period on said communication channel at the time of transmission and reception of voice signals to implement communication using said voice signals; and assigning plural slots for every second period longer than said first period on said communication channel at the time of transmission and reception of data signals to implement communication using said data signals.

15. The communicating method in a radio communication system according to claim 14, wherein at the time of transmission/reception including said data signals, the number of used channels is increased as compared with a case of transmission/reception of only said voice signals.

16. The communicating method in a radio communication system according to claim 14, wherein base station apparatus control information is multiplexed and transmitted from said mobile radio terminal to said base station apparatus over said communication channel so as to control assignment of slots at the time of transmission/reception of said data signals.

17. The communicating method in a radio communication system according to claim 14, wherein the number of assigned slots is altered according to a communication speed of said data signals.

18. The communicating method in a radio communication system according to claim 14, wherein a control data as to whether a data terminal is connected to said mobile radio terminal or not is transmitted from said mobile radio terminal to said base station apparatus over said control channel.

19. The communicating method in a radio communication system according to claim 14, wherein a communication of said data signals is implemented at a timing of vacant slots on said control channel at the time of transmission/reception of said data signals.

* * * * *